(12) United States Patent
Foi et al.

(10) Patent No.: US 9,811,884 B2
(45) Date of Patent: *Nov. 7, 2017

(54) METHODS AND SYSTEMS FOR SUPPRESSING ATMOSPHERIC TURBULENCE IN IMAGES

(71) Applicants: FLIR Systems, Inc., Wilsonville, OR (US); Noiseless Imaging Oy Ltd., Tampere (FI)

(72) Inventors: Alessandro Foi, Tampere (FI); Vladimir Katkovnik, Tampere (FI); Pavlo Molchanov, Tampere (FI); Enrique Sánchez-Monge, Tampere (FI)

(73) Assignees: FLIR Systems, Inc., Wilsonville, OR (US); Noiseless Imaging Oy LTD, Tampere (FI)

( * ) Notice: Subject to any disclaimer, the term of this patent is extended or adjusted under 35 U.S.C. 154(b) by 349 days.

This patent is subject to a terminal disclaimer.

(21) Appl. No.: 14/720,086

(22) Filed: May 22, 2015

(65) Prior Publication Data
US 2015/0254813 A1 Sep. 10, 2015

Related U.S. Application Data

(63) Continuation-in-part of application No. 13/943,035, filed on Jul. 16, 2013, now Pat. No. 9,635,220.
(Continued)

(51) Int. Cl.
*G06T 5/00* (2006.01)
*H04N 5/217* (2011.01)
(Continued)

(52) U.S. Cl.
CPC .............. *G06T 5/002* (2013.01); *H04N 5/21* (2013.01); *H04N 5/217* (2013.01); *H04N 5/33* (2013.01);
(Continued)

(58) Field of Classification Search
CPC . G06T 2207/10016; G06T 2207/10048; G06T 2207/20182; G06T 5/002; H04N 5/21; H04N 5/217; H04N 5/33
See application file for complete search history.

(56) References Cited

U.S. PATENT DOCUMENTS 2,764,055 A 9/1956 Clemens et al.
4,972,260 A 11/1990 Fujikawa et al.
(Continued)

FOREIGN PATENT DOCUMENTS

CA 2764055 7/2012
CN 2874947 2/2007
(Continued)

OTHER PUBLICATIONS

Darpa, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.
(Continued)

*Primary Examiner* — Peter D Le
(74) *Attorney, Agent, or Firm* — Haynes and Boone, LLP

(57) ABSTRACT

Various techniques are disclosed to suppress distortion in images (e.g., video or still images), such as distortion caused by atmospheric turbulence. For example, similar image blocks from a sequence of images may be identified and tracked along motion trajectories to construct spatiotemporal volumes. The motion trajectories are smoothed to estimate the true positions of the image blocks without random displacements/shifts due to the distortion, and the smoothed trajectories are used to aggregate the image blocks in their new estimated positions to reconstruct the sequence of images with the random displacements/shifts suppressed. Blurring that may remain within each image block of the spatiotemporal volumes may be suppressed by modifying the spatiotemporal volumes in a collaborative fashion. For
(Continued)

example, a decorrelating transform may be applied to the spatiotemporal volumes to suppress the blurring in a transform domain, such as by alpha-rooting or other suitable operations on the coefficients of the spectral volumes.

20 Claims, 11 Drawing Sheets

Related U.S. Application Data

(60) Provisional application No. 62/002,731, filed on May 23, 2014, provisional application No. 61/672,010, filed on Jul. 16, 2012.

(51) Int. Cl.
    *H04N 5/33*     (2006.01)
    *H04N 5/21*     (2006.01)

(52) U.S. Cl.
    CPC .............. *G06T 2207/10016* (2013.01); *G06T 2207/10048* (2013.01); *G06T 2207/20182* (2013.01)

(56) References Cited

U.S. PATENT DOCUMENTS

| | | | |
|---|---|---|---|
| 5,157,732 A | 10/1992 | Ishii et al. | |
| 5,598,482 A | 1/1997 | Balasubramanian et al. | |
| 5,841,911 A | 11/1998 | Kopeika et al. | |
| 5,887,084 A | 3/1999 | Wober et al. | |
| 5,943,170 A | 8/1999 | Inbar et al. | |
| 6,122,314 A | 9/2000 | Bruls et al. | |
| 6,211,515 B1 | 4/2001 | Chen et al. | |
| 6,348,951 B1 | 2/2002 | Kim | |
| 6,396,543 B1 | 5/2002 | Shin et al. | |
| 6,424,843 B1 | 7/2002 | Reitmaa et al. | |
| 6,633,231 B1 | 10/2003 | Okamoto et al. | |
| 6,681,120 B1 | 1/2004 | Kim | |
| 6,759,949 B2 | 7/2004 | Miyahara | |
| 6,883,054 B2 | 4/2005 | Yamaguchi et al. | |
| 6,911,652 B2 | 6/2005 | Walkenstein | |
| 7,050,107 B1 | 5/2006 | Frank et al. | |
| D524,785 S | 7/2006 | Huang | |
| 7,084,857 B2 | 8/2006 | Lieberman et al. | |
| 7,208,733 B2 | 4/2007 | Mian et al. | |
| 7,263,379 B1 | 8/2007 | Parkulo et al. | |
| 7,284,921 B2 | 10/2007 | Lapstun et al. | |
| 7,296,747 B2 | 11/2007 | Rohs | |
| 7,305,368 B2 | 12/2007 | Lieberman et al. | |
| 7,321,783 B2 | 1/2008 | Kim | |
| 7,333,832 B2 | 2/2008 | Tsai et al. | |
| 7,362,911 B1 | 4/2008 | Frank | |
| 7,377,835 B2 | 5/2008 | Parkulo et al. | |
| 7,420,663 B2 | 9/2008 | Wang et al. | |
| 7,453,064 B2 | 11/2008 | Lee | |
| 7,477,309 B2 | 1/2009 | Cuccias | |
| 7,567,818 B2 | 7/2009 | Pylkko | |
| 7,572,077 B2 | 8/2009 | Lapstun et al. | |
| 7,575,077 B2 | 8/2009 | Priepke et al. | |
| 7,595,904 B2 | 9/2009 | Lapstun et al. | |
| 7,627,364 B2 | 12/2009 | Sato | |
| 7,697,962 B2 | 4/2010 | Cradick et al. | |
| 7,723,686 B2 | 5/2010 | Hannebauer | |
| 7,725,141 B2 | 5/2010 | Su | |
| 7,728,281 B2 | 6/2010 | Chen | |
| 7,735,974 B2 | 6/2010 | Silverbrook et al. | |
| 7,747,454 B2 | 6/2010 | Bartfeld et al. | |
| 7,760,919 B2 | 7/2010 | Namgoong | |
| 7,761,114 B2 | 7/2010 | Silverbrook et al. | |
| 7,773,870 B2 | 8/2010 | Naruse | |
| 7,801,733 B2 | 9/2010 | Lee et al. | |
| 7,810,733 B2 | 10/2010 | Silverbrook et al. | |
| 7,872,574 B2 | 1/2011 | Betts et al. | |
| 7,900,842 B2 | 3/2011 | Silverbrook et al. | |
| 7,903,152 B2 | 3/2011 | Kim | |
| 7,947,222 B2 | 5/2011 | Bae et al. | |
| 7,960,700 B2 | 6/2011 | Craig et al. | |
| 8,275,413 B1 | 9/2012 | Fraden et al. | |
| 8,305,577 B2 | 11/2012 | Kivioja et al. | |
| 8,345,226 B2 | 1/2013 | Zhang | |
| 8,447,129 B2 | 5/2013 | Arrasmith | |
| 8,537,343 B2 | 9/2013 | Zhang | |
| 8,553,108 B2 | 10/2013 | Holmlund | |
| 8,781,420 B2 | 7/2014 | Schlub et al. | |
| 8,825,112 B1 | 9/2014 | Fraden et al. | |
| 2002/0006337 A1 | 1/2002 | Kimura et al. | |
| 2002/0122036 A1 | 9/2002 | Sasaki | |
| 2002/0135571 A1 | 9/2002 | Klocek et al. | |
| 2002/0140542 A1 | 10/2002 | Prokoski et al. | |
| 2002/0149600 A1 | 10/2002 | Van Splunter et al. | |
| 2002/0171737 A1 | 11/2002 | Tullis | |
| 2003/0007193 A1 | 1/2003 | Sato et al. | |
| 2003/0112871 A1 | 6/2003 | Demos | |
| 2003/0122957 A1 | 7/2003 | Emme | |
| 2003/0223623 A1 | 12/2003 | Gutta et al. | |
| 2004/0028286 A1 | 2/2004 | Saigusa et al. | |
| 2004/0047518 A1 | 3/2004 | Tiana | |
| 2004/0101298 A1 | 5/2004 | Mandelbaum et al. | |
| 2004/0127156 A1 | 7/2004 | Park | |
| 2004/0128070 A1 | 7/2004 | Schmidt et al. | |
| 2004/0157612 A1 | 8/2004 | Kim | |
| 2004/0165788 A1 | 8/2004 | Perez et al. | |
| 2004/0169860 A1 | 9/2004 | Jung et al. | |
| 2004/0179738 A1 | 9/2004 | Dai et al. | |
| 2004/0207036 A1 | 10/2004 | Ikeda | |
| 2004/0212703 A1 | 10/2004 | Sugimoto et al. | |
| 2004/0256561 A1 | 12/2004 | Beuhler et al. | |
| 2005/0030314 A1 | 2/2005 | Dawson | |
| 2005/0067852 A1 | 3/2005 | Jeong | |
| 2005/0068333 A1 | 3/2005 | Nakahashi et al. | |
| 2005/0089241 A1 | 4/2005 | Kawanishi et al. | |
| 2005/0093890 A1 | 5/2005 | Baudisch | |
| 2005/0110803 A1 | 5/2005 | Sugimura | |
| 2005/0138569 A1 | 6/2005 | Baxter et al. | |
| 2005/0151961 A1 | 7/2005 | McGraw et al. | |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0038826 A1 | 2/2006 | Daly | |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0164699 A1 | 7/2006 | Inoue | |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0279758 A1 | 12/2006 | Myoki | |
| 2006/0285907 A1 | 12/2006 | Kang et al. | |
| 2007/0004449 A1 | 1/2007 | Sham | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0052616 A1 | 3/2007 | Yoon | |
| 2007/0057764 A1 | 3/2007 | Sato et al. | |
| 2007/0103479 A1 | 5/2007 | Kim et al. | |
| 2007/0120879 A1 | 5/2007 | Kanade et al. | |
| 2007/0132858 A1 | 6/2007 | Chiba et al. | |
| 2007/0139739 A1 | 6/2007 | Kim et al. | |
| 2007/0159524 A1 | 7/2007 | Kim et al. | |

(56) References Cited

U.S. PATENT DOCUMENTS

| | | |
|---|---|---|
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0025630 A1 | 1/2008 | Hofman et al. |
| 2008/0038579 A1 | 2/2008 | Schuisky et al. |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0112630 A1* | 5/2008 | Nestares .............. H04N 5/144 382/236 |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0266413 A1 | 10/2008 | Cohen et al. |
| 2008/0278607 A1 | 11/2008 | Zhang et al. |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0021611 A1 | 1/2009 | Utsugi |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |
| 2009/0148019 A1 | 6/2009 | Hamada et al. |
| 2009/0167778 A1* | 7/2009 | Wei .............. G09G 5/00 345/587 |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090965 A1 | 4/2010 | Birkler |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0050969 A1 | 3/2011 | Nishihara |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0075506 A1 | 3/2012 | Van Beek |
| 2012/0083314 A1 | 4/2012 | Ng et al. |
| 2012/0099001 A1 | 4/2012 | Oyama |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2012/0320086 A1 | 12/2012 | Kasama et al. |
| 2013/0204570 A1 | 8/2013 | Mendelson et al. |
| 2013/0320220 A1 | 12/2013 | Donowsky |
| 2014/0015921 A1 | 1/2014 | Foi et al. |

FOREIGN PATENT DOCUMENTS

| | | |
|---|---|---|
| CN | 2899321 | 5/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 202261481 | 5/2012 |
| CN | 102880289 | 1/2013 |
| CN | 202998279 | 6/2013 |
| DE | 102006057431 | 6/2008 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |

(56) References Cited

FOREIGN PATENT DOCUMENTS

| | | |
|---|---|---|
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 20060054877 | 5/2006 |
| KR | 20060071220 | 6/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 20110006437 | 1/2011 |
| KR | 20110011264 | 2/2011 |
| KR | 2011024290 | 3/2011 |
| KR | 20110019994 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

OTHER PUBLICATIONS

Maggioni et al., "Video denoising using separable 4-D nonlocal spatiotemporal transforms", Image Processing: Algorithms and Systems, Feb. 10, 2011, pp. 1-11, vol. 7870, No. 1, Bellingham, WA.

MacKay et al., "High Resolution Imaging in the Visible from the Ground without Adaptive Optics: New Techniques and Results", Ground-based Instrumentation for Astronomy, Sep. 2004, pp. 128-135, vol. 5492, Proceedings of SPIE, Bellingham, WA.

(56) References Cited

OTHER PUBLICATIONS

Law et al., "Lucky imaging: high angular resolution imaging in the visible from the ground*", Astronomy & Astrophysics, Sep. 26, 2005, pp. 739-745, EDP Sciences, United Kingdom.

Li, Dalong, "Suppressing atmospheric turbulent motion in video through trajectory smoothing" Signal Processing, Oct. 14, 2008, pp. 649-655, vol. 89, Elsevier B.V. Philadelphia, PA.

Pan et al., "Fast-Regularized Kernel Estimation for Robust Motion Deblurring", Sep. 2013, pp. 841-844, vol. 20, No. 9, IEEE Signal Processing Letters, Piscataway, N.J.

Anantrasirichai et al., "Atmospheric Turbulence Mitigation Using Complex Wavelet-Based Fusion", Jun. 2013, pp. 2398-2408, vol. 22, No. 6, IEE Transactions on Image Processing, Piscataway, N.J.

Krishnan et al., "Blind Deconvolution Using a Normalized Sparsity Measure", Computer Vision and Pattern Recognition (CVPR), Jun. 2011, pp. 233-240, IEEE, Piscataway, N.J.

Dabov et al., "Image Denoising by Sparse 3-D Transform-Domain Collaborative Filtering", IEE Transactions on Image Processing, Aug. 2007, pp. 2080-2095, vol. 16, No. 8, IEEE, Piscataway, N.J.

Cerrano, Carmen J., "Speckle imaging over horizontal paths", High-Resolution Wavefront Control: Methods, Devices, and Applications IV, 109, Nov. 1, 2002, pp. 109-120, vol. 4825, Proceedings of SPIE, Bellingham, WA.

Cerrano, C.J., "Mitigating atmospheric effects in high-resolution infra-red surveillance imagery with bispectral speckle imaging", Image Reconstruction from Incomplete Data IV, Sep. 5, 2006, pp. 1-12, vol. 6316, Proceedings of SPIE, Bellingham, WA.

Levin et al., "Understanding and evaluating blind deconvolution algorithms", Conference on Computer Vision and Pattern Recognition, Aug. 2009, pp. 1964-1971, IEEE, Piscataway, N.J.

Shan et al., "High-quality Motion Deblurring from a Single Image", Aug. 2008, pp. 73-73:10, vol. 27, No. 3, Article 73, ACM Transactions on Graphics, New York, NY.

Lohmann et al., "Speckle masking in astronomy: triple correlation theory and applications", Dec. 15, 1983, pp. 4028-4037, vol. 22, No. 24, Applied Optics, Washington, D.C.

Goldstein et al., "Blur-Kernel Estimation from Spectral Irregularities", ECCV'12 Proceedings of the 12th European conference on Computer Vision, 2012, pp. 622-635, vol. Part V, LNCS 7576, Springer-Verlag Berlin, Heidelberg, Germany.

Fried, D.L., "Optical Resolution Through a Randomly Inhomogeneous Medium for Very Long and Very Short Exposures", Journal of the Optical Society of America Oct. 1966, pp. 1372-1379, vol. 56, No. 10, OSA Publishing, Washington, D.C.

Zhu et al., "Removing Atmospheric Turbulence via Space-Invariant Deconvolution", Transactions on Pattern Analysis and Machine Intelligence, Jan. 2013, pp. 157-170, vol. 35, No. 1, IEEE, Piscataway, N.J.

Dodson, Brandon, "Adaptive optics system clobbers Hubble with the sharpest-ever telescopic images", Aug. 28, 2013, 7 pages, Carnegie Institute for Science, Washington, D.C.

Romanenko et al. "Block matching noise reduction method for photographic images, applied in Bayer RAW domain, optimized for real-time implementation", Apr. 26, 2012, 14 pages, vol. 8437, Proceedings of SPIE, Bellingham, WA.

Yang, Jie Xiang, "Adaptive Filtering Techniques for Acquisition Noise and Coding Artifacts of Digital Pictures", School of Electrical and Computer Engineering Science, Engineering and Technology College, Aug. 2010, 160 pages, RMIT University, Melbourne, Australia.

* cited by examiner

PSD of random noise in 4x4 2-D transform domain

PSD of FPN in 4x4 2-D transform domain

PSD of random noise in 8x8 2-D transform domain

PSD of FPN in 8x8 2-D transform domain

METHODS AND SYSTEMS FOR SUPPRESSING ATMOSPHERIC TURBULENCE IN IMAGES

CROSS-REFERENCE TO RELATED APPLICATIONS

This application is a continuation-in-part of U.S. patent application Ser. No. 13/943,035 filed on Jul. 16, 2013 and entitled "METHODS AND SYSTEMS FOR SUPPRESSING NOISE IN IMAGES", which is hereby incorporated by reference in its entirety.

U.S. patent application Ser. No. 13/943,035 claims the benefit of U.S. Provisional Patent Application No. 61/672,010 filed on Jul. 16, 2012 and entitled "METHODS AND SYSTEMS FOR SUPPRESSING NOISE IN IMAGES", which is incorporated herein by reference in its entirety.

This application also claims the benefit of U.S. Provisional Patent Application No. 62/002,731 filed on May 23, 2014 and entitled "SUPPRESSION OF ATMOSPHERIC TURBULENCE IN IMAGES", which is incorporated herein by reference in its entirety.

TECHNICAL FIELD

One or more embodiments of the invention relate generally to digital imaging processing and more particularly, for example, to noise and distortion suppression in images.

BACKGROUND

Noise is one of the main causes of degradation in images (e.g., video and still images) captured by image sensors. Conventional noise filtering techniques typically apply various averaging or smoothing operations to suppress noise, under the assumption that noise is random and unstructured such that it can be canceled out by averaging or smoothing.

However, the assumption of unstructured randomness of noise is not accurate. In fact, noise may include both a fixed pattern noise (FPN) component (e.g., due to column noise in readout circuitry, irregular pixel sizes, and/or other irregularities) and a random noise component. The FPN component may appear as a noisy pattern that is essentially constant through time, and as such it is not attenuated by averaging, but often becomes even more visible after conventional noise filtering. The FPN becomes more problematic for low-cost sensors, sensors with extremely narrow pixel-pitch, or sensors operating in implementations with a very low signal-to-noise ratios (SNRs) (e.g., in low-light imaging, thermal imaging, range imaging, or other imaging applications with low SNRs). Furthermore, for most imagers, both the FPN and random noise components are typically structured (e.g., colored noise), with different correlations present in the FPN and random noise components. Thus, conventional filtering techniques often produce images with prominent structured artifacts.

In addition to random and fixed pattern noise, images may contain distortion and degradation caused by atmospheric turbulence as light travels through the air from the source to an image sensor, which may particularly be noticeable in outdoor and/or long distance images. For example, variations in the refractive index in turbulent air may cause image blur randomly varying in space and time, large-magnitude shifts (also referred to as "dancing") of image patches also randomly varying in space and time, and random geometrical distortion (also referred to as "random warping") of images.

Conventional techniques such as bispectrum imaging, lucky imaging, and temporal averaging have been developed to address at least some distortion caused by atmospheric turbulence. However, such conventional techniques require static scenes (e.g., a plurality of short-exposure frames of the same static scene) to work. While such conventional techniques may be adapted to work on scenes with motion or moving objects by applying the techniques on a sliding temporal window basis, this produces various undesirable results. For example, applying such conventional techniques to scenes with motion or moving objects typically leads to motion blur as well as ghosting effects. Further in this regard, high temporal frequency content is lost from scenes with motion when such conventional techniques are applied, in addition to losing high spatial frequency content.

SUMMARY

Various techniques are disclosed to suppress distortion in images (e.g., video or still images), such as distortion caused by atmospheric turbulence. For example, in various embodiments, similar image blocks from a sequence of images (e.g., a sequence of video frames) may be identified and tracked along motion trajectories to construct spatiotemporal volumes. The motion trajectories may contain random shifts/displacements (or other spatial low/mid frequency components of the distortion) that are caused, for example, by atmospheric turbulence, whereas the contents of the image blocks in the spatiotemporal volumes may be affected by blurring (or other higher spatial components of the distortion) that remains within each image block. In various embodiments, the motion trajectories are smoothed to estimate the true positions of the image blocks without the random displacements, and the smoothed trajectories are used to aggregate the image blocks in their new estimated positions to reconstruct the sequence of images with the random displacements/shifts suppressed. In various embodiments, the blurring effect that may remain within each image block of the spatiotemporal volumes may be suppressed by modifying the spatiotemporal volumes in a collaborative fashion. For example, a decorrelating transform may be applied to the spatiotemporal volumes to suppress the blurring effects in a transform domain, such as by alpha-rooting or other suitable operations on the coefficients of the spectral volumes corresponding to the spatiotemporal volumes.

In one embodiment, a method includes: receiving a plurality of video image frames; extracting a plurality of image blocks from the received video image frames along motion trajectories, wherein the motion trajectories includes random displacements due to distortion in the received video image frames; smoothing the motion trajectories to suppress the random displacements; and aggregating the image blocks according to the smoothed trajectories to generate a plurality of processed video image frames, wherein at least some of the distortion is suppressed in the processed video image frames.

In another embodiment, a system includes a video interface configured to receive a plurality of video image frames; a processor in communication with the video interface and configured to extract a plurality of image blocks from the received video image frames along motion trajectories, wherein the motion trajectories includes random displacements due to distortion in the received video image frames, smooth the motion trajectories to suppress the random displacement, and aggregate the image blocks according to the smoothed trajectories to generate a plurality of processed video image frames, wherein at least some of the distortion is suppressed in the processed video image frames; and a memory in communication with the processor and configured to store the processed video image frames.

The distortion in the received video image frames may, for example, be due to atmospheric turbulence. In some embodiments, the method may further include, and the system may be further configured to perform, operations to construct spatiotemporal volumes using the extracted image blocks and to modify the spatiotemporal volumes to suppress blurring due to the distortion. For example, the blurring may be suppressed in a transform domain by applying a decorrelating transform to the spatiotemporal volumes to generate corresponding three dimensional (3-D) spectra and modifying at least some of the spectral coefficients in each of the 3-D spectra, such as by alpha-rooting the spectral coefficients.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
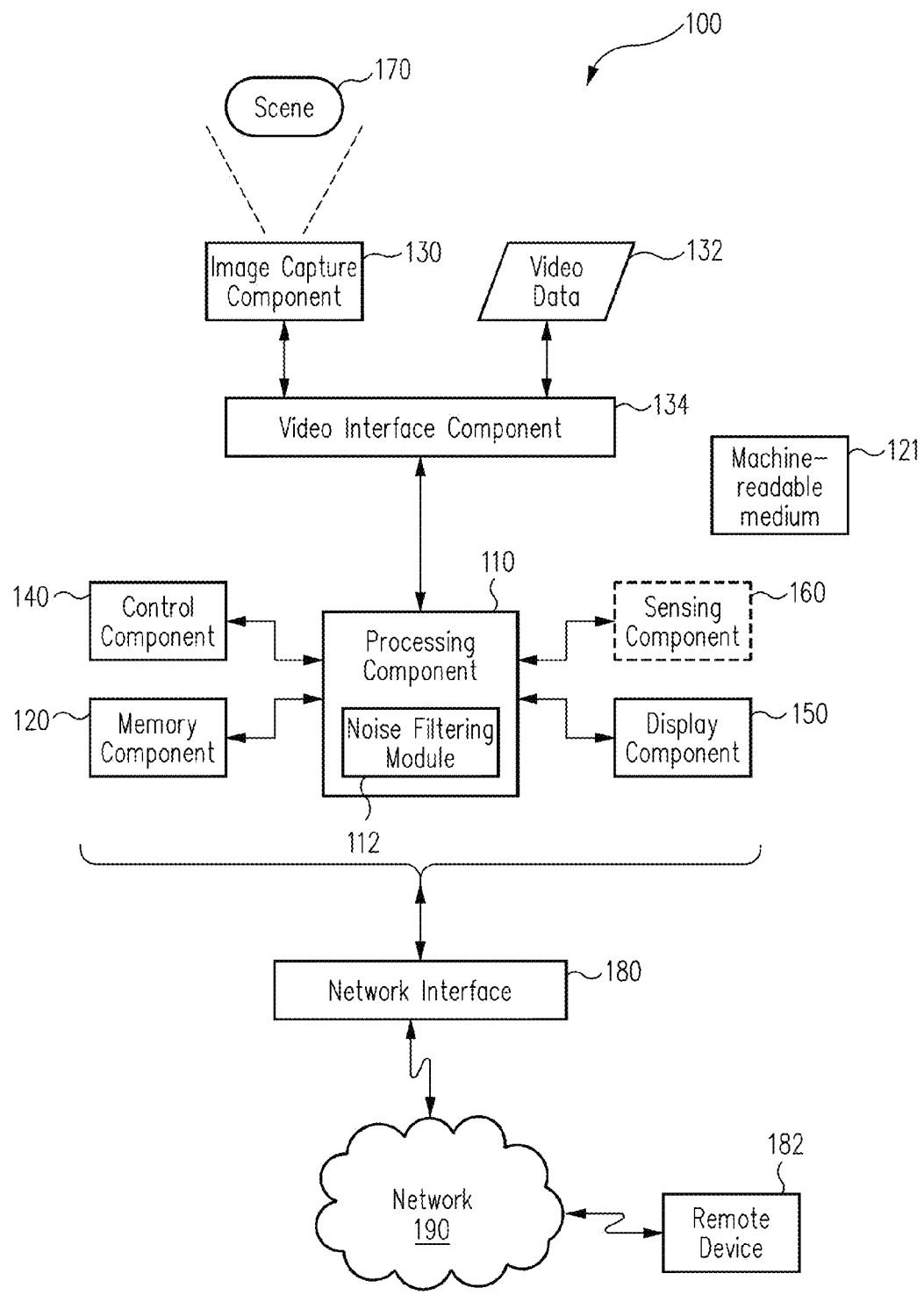
FIG. 1 illustrates a block diagram of a video processing system in accordance with an embodiment of the disclosure.

Various embodiments of methods and systems disclosed herein may be used to model random noise and FPN to suppress both types of noise in images (e.g., video or still images). More specifically, in one or more embodiments, methods and systems may permit effective suppression of noise even in images that have a prominent FPN component, by modeling noise more accurately to comprise both random noise and FPN components, estimating one or more noise parameters, filtering images based on motion-adaptive parameters, and/or performing other operations described herein.

In one aspect of methods and systems disclosed herein, filtering may be performed on spatiotemporal volumes, any one of which may be constructed by grouping image blocks (e.g., a fixed-size portion or patch of a video image frame) extracted from a sequence of video image frames along a motion trajectory. Because different image blocks in such a spatiotemporal volume may belong to different spatial positions on a video image, FPN may be revealed as random noise in the volume, and thus may be modeled and filtered as such. If there is little or no motion, different image blocks may be aligned (e.g., belong to the same spatial positions on video image frames) and thus FPN may be preserved as such in the spatiotemporal volumes. In this regard, various embodiments of the disclosure may effectively suppress FPN by adaptively filtering the spatiotemporal volumes based not only on various noise parameters, but also on the relative motion captured in the spatiotemporal volumes, as further described herein.

In another aspect of methods and systems disclosed herein, one or more noise parameters associated with both FPN and random noise may be estimated using video images to be processed and/or other video images that may be used for purposes of estimating noise parameters, according to various embodiments of the disclosure. Similarly, in some embodiments, one or more parameters for processing video images to suppress distortion/degradation (e.g., distortion/degradation caused by atmospheric turbulence) may be estimated using video images to be processed and/or other video images (e.g., reference video images) that may be used for obtaining estimates.

Thus, in various embodiments, filtering operations may be adaptively performed on the spatiotemporal volumes based on the estimated noise parameters and the motion captured in the volumes (e.g., relative spatial alignment of image blocks from frame to frame). In some embodiments, such filtering operations may be efficiently performed by applying a three-dimensional (3-D) transform (e.g., a discrete cosine transform (DCT), discrete sine transform (DST), discrete wavelet transform (DWT), or other orthogonal transforms) to the spatiotemporal volumes to obtain 3-D spectra, modifying (e.g., adjusting, adaptively shrinking) coefficients of the 3-D spectra, and applying an inverse transform to obtain filtered spatiotemporal volumes. Image blocks from the filtered spatiotemporal volumes may be aggregated (e.g., combined or averaged using adaptive or non-adaptive weights) to construct filtered video image frames. Video image frames in some embodiments may be a set of discrete still images, which can be utilized to provide digital still images (e.g., as digital photographs captured by a digital camera).

Therefore, for example, various embodiments of methods and systems disclosed herein may be included in or implemented as various devices and systems such as infrared imaging devices, mobile digital cameras, video surveillance systems, video processing systems, or other systems or devices that may need to obtain acceptable quality video images from video images impaired by noise (e.g., captured by infrared image sensors or other sensors operating at a low signal-to-noise ratio regime). Furthermore, various techniques disclosed herein not limited to providing noise suppression, but may further beneficially improve performance of various other video processing operations such as enhancement, restoration, deblurring, equalization, sharpening, super-resolution, and other operations that can be impaired by noise, as well as performance of high-level analytics such as object detection, object identification, target tracking, segmentation, scene tracking, and other analytics operations.

FIG. 1 shows a block diagram of a system 100 (e.g., an infrared camera) for capturing and/or processing video images in accordance with an embodiment of the disclosure. The system 100 comprises, in one implementation, a processing component 110, a memory component 120, an image capture component 130, a video interface component 134, a control component 140, a display component 150, a sensing component 160, and/or a network interface 180.

System 100 may represent an imaging device, such as a video camera, to capture and/or process images, such as video images of a scene 170. In one embodiment, system 100 may be implemented as an infrared camera configured to detect infrared radiation and provide representative data and information (e.g., infrared image data of a scene). For example, system 100 may represent an infrared camera that is directed to the near, middle, and/or far infrared spectrums. In some embodiments, image data captured and/or processed by system 100 may comprise non-uniform data (e.g., real image data that is not from a shutter or black body) of the scene 170, for processing, as set forth herein. System 100 may comprise a portable device and may be incorporated, for example, into a vehicle (e.g., an automobile or other type of land-based vehicle, an aircraft, or a spacecraft) or a non-mobile installation requiring infrared images to be stored and/or displayed.

In various embodiments, processing component 110 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. Processing component 110 may be adapted to interface and communicate with various other components of system 100 perform method and processing steps and/or operations, as described herein. Processing component 110 may include a noise filtering module 112 configured to implement a noise suppression and/or removal operation such as discussed in reference to FIGS. 2A-11B). In one aspect, processing component 110 may be configured to perform various other image processing algorithms including scaling and/or converting image data, either as part of or separate from the noise filtering operation.

It should be appreciated that noise filtering module 112 may be integrated in software and/or hardware as part of processing component 110, with code (e.g., software or configuration data) for noise filtering module 112 stored, for example, in memory component 120. Embodiments of the noise filtering operation as disclosed herein, may be stored by a separate machine-readable medium 121 (e.g., a memory, such as a hard drive, a compact disk, a digital video disk, or a flash memory) to be executed by a computer (e.g., a logic or processor-based system) to perform various methods and operations disclosed herein. In one aspect, machine-readable medium 121 may be portable and/or located separate from system 100, with the stored noise filtering operation provided to system 100 by coupling the computer-readable medium to system 100 and/or by system 100 downloading (e.g., via a wired link and/or a wireless link) the noise filtering operation from computer-readable medium 121.

Memory component 120 comprises, in one embodiment, one or more memory devices configured to store data and information, including video image data and information. Memory component 120 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. Processing component 110 may be configured to execute software stored in memory component 120 so as to perform method and process steps and/or operations described herein. Processing component 110 may be configured to store in memory component 120 video image data captured by image capture component 130 and/or received via video interface component 134. Processing component 110 may be configured to store processed (e.g., filtered) video image data in memory component 120.

Image capture component 130 may comprise, in various embodiments, one or more image sensors for capturing image data (e.g., still image data and/or video data) representative of an image, such as scene 170. In one embodiment, image capture component 130 may comprise one or more infrared sensors (e.g., any type of multi-pixel infrared detector, such as a focal plane array) for capturing thermal image data (e.g., thermal still image data and/or thermal video data) representative of an image, such as scene 170. In one embodiment, the infrared sensors of image capture component 130 may provide for representing (e.g., converting) the captured image data as digital data (e.g., via an analog-to-digital converter included as part of the infrared sensor or separate from the infrared sensor as part of the system 100). In another embodiment, digital conversion and/or other interfacing may be provided at video interface component 134.

In one aspect, video and/or still image data (e.g., thermal video data) may comprise non-uniform data (e.g., real image data) of an image, such as scene 170. Video and/or still image data may also comprise, in some embodiments, uniform data (e.g., image data of a shutter or a reference black body) that may be utilized, for example, as calibration video and/or calibration image data. Processing component 110 may be configured to process the captured image data (e.g., to provide processed image data), store the image data in the memory component 120, and/or retrieve stored image data from memory component 120. For example, processing component 110 may be adapted to process thermal image data stored in memory component 120 to provide processed (e.g., filtered) image data and information.

Video interface component 134 may include, in some embodiments, appropriate input ports, connectors, switches, and/or circuitry configured to interface with external devices (e.g., remote device 182 and/or other devices) to receive video data (e.g., video data 132) generated by or otherwise stored at the external devices. The received video data may be provided to processing component 110. In this regard, the received video data may be converted into signals or data suitable for processing by processing component 110. For example, in one embodiment, video interface component 134 may be configured to receive analog video data and convert it into suitable digital data to be provided to processing component 110. In one aspect of this embodiment, video interface component 134 may comprise various standard video ports, which may be connected to a video player, a video camera, or other devices capable of generating standard video signals, and may convert the received video signals into digital video/image data suitable for processing by processing component 110. In some embodiments, video interface component 134 may be also configured to interface with and receive image data from image capture component 130. In other embodiments, image capture component 130 may interface directly with processing component 110.

Control component 140 comprises, in one embodiment, a user input and/or interface device, such as a rotatable knob (e.g., potentiometer), push buttons, slide bar, keyboard, and/or other devices, that is adapted to generate a user input control signal. Processing component 110 may be adapted to sense control input signals from a user via control component 140 and respond to any sensed control input signals received therefrom. Processing component 110 may be adapted to interpret such a control input signal as a value, as generally understood by one skilled in the art. In one embodiment, control component 140 may comprise a control unit (e.g., a wired or wireless handheld control unit) having push buttons adapted to interface with a user and receive user input control values. In one implementation, the push buttons of the control unit may be used to control various functions of system 100, such as autofocus, menu enable and selection, field of view, brightness, contrast, noise filtering, image enhancement, and/or various other features.

Display component 150 comprises, in one embodiment, an image display device (e.g., a liquid crystal display (LCD)) or various other types of generally known video displays or monitors. Processing component 110 may be adapted to display image data and information on display component 150. Processing component 110 may be adapted to retrieve image data and information from memory component 120 and display any retrieved image data and information on display component 150. Display component 150 may comprise display circuitry, which may be utilized by the processing component 110 to display image data and information (e.g., filtered thermal images). Display component 150 may be adapted to receive image data and information directly from image capture component 130 via processing component 110 and/or video interface component 134, or the image data and information may be transferred from memory component 120 via processing component 110.

Sensing component 160 comprises, in one embodiment, one or more sensors of various types, depending on the application or implementation requirements, as would be understood by one skilled in the art. Sensors of sensing component 160 provide data and/or information to at least processing component 110. In one aspect, processing component 110 may be adapted to communicate with sensing component 160 (e.g., by receiving sensor information from sensing component 160) and with image capture component 130 (e.g., by receiving data and information from the image capture component 130 and providing and/or receiving command, control, and/or other information to and/or from one or more other components of the system 100).

In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the data provided by image capture component 130.

In some implementations, sensing component 160 (e.g., one or more of sensors) may comprise devices that relay information to processing component 110 via wired and/or wireless communication. For example, sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, various components of system 100 may be combined and/or implemented or not, as desired or depending on the application or requirements. In one example, processing component 110 may be combined with memory component 120, the image capture component 130, video interface component, display component 150, network interface 180, and/or sensing component 160. In another example, processing component 110 may be combined with image capture component 130 with only certain functions of processing component 110 performed by circuitry (e.g., a processor, a microprocessor, a logic device, a microcontroller, etc.) within image capture component 130.

Furthermore, in some embodiments, various components of system 100 may be distributed and in communication with one another over a network 190. In this regard, system 100 may include network interface 180 configured to facilitate wired and/or wireless communication among various components of system 100 over network. In such embodiments, components may also be replicated if desired for particular applications of system 100. That is, components configured for same or similar operations may be distributed over a network. Further, all or part of any one of the various components may be implemented using appropriate components of a remote device 182 (e.g., a conventional digital video recorder (DVR), a computer configured for image processing, and/or other device) in communication with various components of system 100 via network interface 180 over network 190, if desired. Thus, for example, all or part of processor 110, all or part of memory component 120, and/or all of part of display component 150 may be implemented or replicated at remote device 182, and configured to perform filtering of video image data as further described herein. In another example, system 100 may a comprise image capture component located separately and remotely from processing component 110 and/or other components of system 100. It will be appreciated that many other combinations of distributed implementations of system 100 are possible, without departing from the scope and spirit of the disclosure.

Figure 2B:
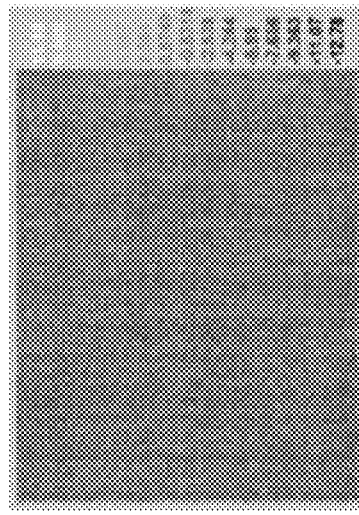
FIGS. 2A-2B illustrate examples of random noise in video images in accordance with an embodiment of the disclosure.
Figure 2C:
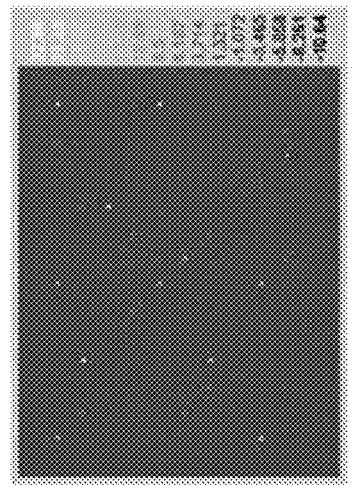
FIG. 2C illustrates an example of fixed pattern noise (FPN) in video images in accordance with an embodiment of the disclosure.
Figure 2A:
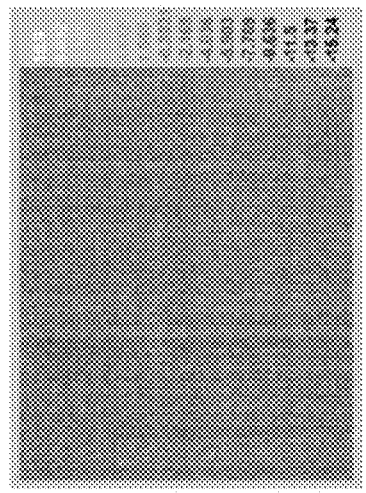

FIG. 2A-2C show examples of random noise and FPN in video image data in accordance with an embodiment of the disclosure. More specifically, FIGS. 2A-2B show examples of random noise extracted respectively from two consecutive video image frames, and FIG. 2C shows FPN that persists in a sequence of video image frames. In FIGS. 2A-2C, FPN is substantially constant (e.g., does not vary or vary only slightly) overtime (e.g., over consecutive video image frames), whereas random noise may vary randomly with respect to time.

Video image data captured by many image sensors exhibit both random noise and FPN. Whereas many conventional filtering techniques simply model noise present in still or video images as random and unstructured noise, systems and methods disclosed herein advantageously model both a random noise component and a FPN component in video image data to effectively suppress both types of noise therein. In various embodiments, noise that may appear as a result of sensor defects (e.g., response non-uniformity, dead pixels, hot pixels, or other defects) may also be modeled or otherwise considered as part of FPN. Moreover, noise exhibited in still or video images captured by many image sensors is not unstructured noise. Rather, both the random component and FPN component may be correlated. That is, noise pixels in different spatial (e.g., different pixel coordinates) and temporal (e.g., in different frames) locations are not independent of one another, but rather are correlated with each other. Typical noise in video image data may therefore be referred to as "colored" noise, rather than "white" noise.

Figure 3A:
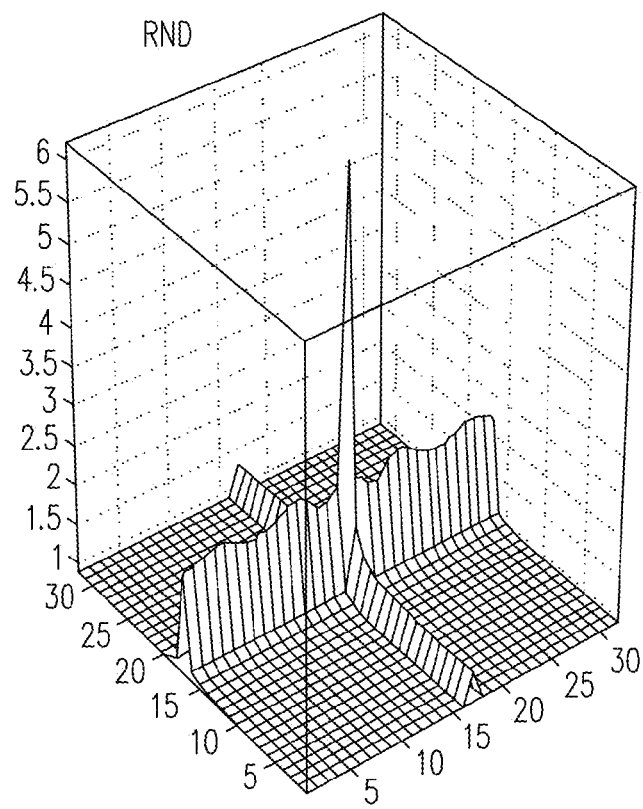
FIGS. 3A and 3B illustrate graphs representing examples of power spectral densities of random noise and FPN components, respectively, in accordance with an embodiment of the disclosure.
Figure 3B:
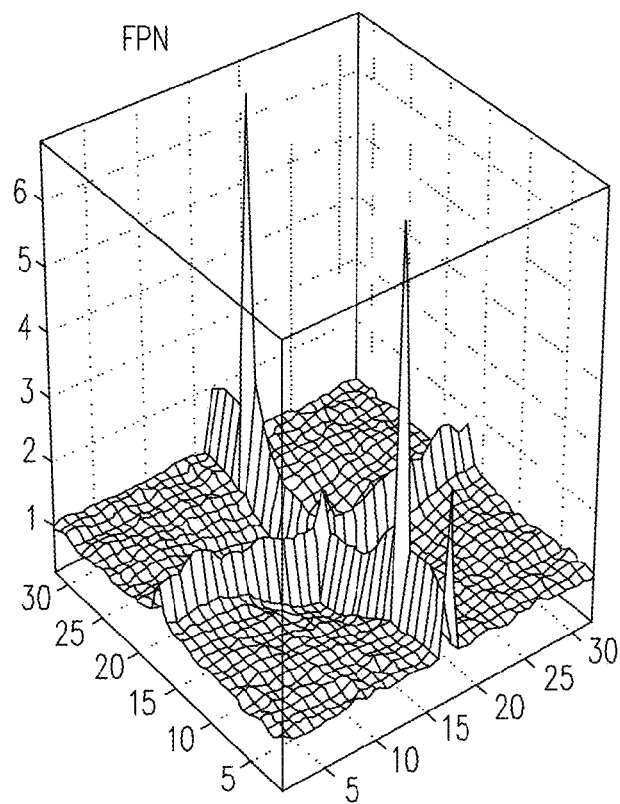

Such characteristics may be readily observed in power spectral density (PSD) graphs of example noise as shown in FIGS. 3A-3B. More specifically, FIG. 3A shows a PSD graph of an example random noise component and FIG. 3B shows a PSD graph of an example FPN component, both of which are computed and presented with respect to a 32×32 Fourier transform and shown with a direct current (DC) term at the center. As generally known by one skilled in image processing, a PSD graph of white noise shows a substantially same constant value for all coefficients. In contrast, typical example noise in FIGS. 3A-3B is characterized by clear and distinct non-uniform PSD graphs in both random noise and FPN components. For example, the PSD graph of random noise in FIG. 3A shows a larger horizontal correlation, which may typically be due to column noise in many types of image sensors. As may be appreciated, correlations of noise may be analyzed and expressed with respect to other transforms than the Fourier transform, for example, with respect to the discrete cosine transform (DCT), various types of wavelet transforms, or other suitable transforms.

In embodiments of systems and methods disclosed herein, such structured properties (or "coloredness") of typical noise may be modeled for both random noise and FPN components, thereby permitting effective suppression of noise in video image data through a more accurate model of typical noise therein.

In one embodiment, both random noise and FPN components may be modeled as colored Gaussian noise. Experiments performed in connection with the disclosure have revealed that Gaussian distributions may be taken as good approximations for both noise components. In other embodiments, other distributions, such as a Poisson distribution or a Rician distribution, may be used in place of Gaussian distributions.

One example of random noise and FPN components modeled as colored Gaussian noise may be described mathematically as follows. Let $x_i \in X_i \subseteq Z$, $l=1,2$, be pixel spatial coordinates and $t \in T \subseteq Z$ be a video image frame index (e.g., time index). Also, let $X=X_1 \times X_2$ and $V=X \times T$ denote, respectively, a spatial (e.g., directed to pixels within a video image frame) domain and a spatiotemporal (e.g., directed to a sequence of video image frames) domain. Then, in one example, noisy video data $z:V \to R$ may be modeled as:

$$z(x_1,x_2,t)=y(x_1,x_2,t)+\eta_{RND}(x_1,x_2,t)+\eta_{FPN}(x_1,x_2,t) \quad \text{(Equation 1)}$$

wherein $y:V \to R$ is an unknown noise-free video, $\eta_{RND}:V \to R$ and $\eta_{FPN}:V \to R$ are realizations of random and FPN components.

As discussed above, in one embodiment, these two noise components may be assumed and modeled as colored Gaussian noise, $$\eta_{RND}=k_{RND} \otimes \eta_{RND}^{white}, \quad \text{(Equation 2)}$$

$$\eta_{FPN}=k_{FPN} \otimes \eta_{FPN}^{white}, \quad \text{(Equation 3)}$$

wherein $\eta_{RND}^{white}$ are $\eta_{FPN}^{white}$ white noise factors following independent and identically distributed (i.i.d.) Gaussian distributions such that:

$$\eta_{RND}^{white}(x_1,x_2,t) \sim N(0,\sigma_{RND}^2(t)), \text{ i.i.d. w.r.t. } x_1,x_2 \text{ and independent w.r.t. } t, \quad \text{(Equation 4)}$$

$$\eta_{FPN}^{white}(x_1,x_2,t) \sim N(0,\sigma_{FPN}^2(t)), \text{ i.i.d. w.r.t. } x_1,x_2 \text{ but not independent w.r.t. } t, \quad \text{(Equation 5)}$$

wherein $\otimes$ denotes the convolution operator, $k_{RND}$ and $k_{FPN}$ are equivalent convolution kernels determining power spectral densities of $\eta_{RND}$ and $\eta_{FPN}$ respectively.

In various embodiments, standard deviation values $\sigma_{RND}$ and $\sigma_{FPN}$ may be estimated from video image data as further described herein. Experiments performed in connection with the disclosure have revealed that standard deviation values $\sigma_{RND}$ and $\sigma_{FPN}$, as well as FPN $\eta_{FPN}$ typically vary slowly over time. As such, standard deviation values $\sigma_{RND}$ and $\sigma_{FPN}$ may be estimated only sporadically in some embodiments.

More specifically, it may be assumed that:

$$\frac{\partial}{\partial t}\sigma_{RND}(t) \approx 0, \quad \text{(Equation 6)}$$

$$\frac{\partial}{\partial t}\sigma_{FPN}(t) \approx 0, \quad \text{(Equation 7)}$$

$$\frac{\partial}{\partial t}\eta_{FPN}(x_1, x_2, t) \approx 0, \quad \text{(Equation 8)}$$

wherein the approximations of these partial derivatives with respect to t are such that $\sigma_{RND}$, $\sigma_{FPN}$, and $\eta_{FPN}$ may be treated as constant with respect to t within temporal windows that are used by operations (e.g., filtering operations) described herein.

In addition, PSDs of $\eta_{RND}$ and $\eta_{FPN}$ may be assumed to be fixed modulus normalization with respect to corresponding $\sigma_{RND}^2$ and $\sigma_{FPN}^2$. That is, PSDs do not need to be estimated during operations on video image data, but rather may be treated as built-in calibration parameters in some embodiments. As such, in some embodiments, PSDs of $\eta_{RND}$ and $\eta_{FPN}$ may be estimated offline using calibration video images or any other images that may be suitable for calibration purposes, and only need to be re-calibrated periodically or as needed.

In some embodiments, equation 1 may be generalized to incorporate a signal-dependent noise model, by having $\sigma_{RND}$ and $\sigma_{FPN}$ as functions of both y and t. Such functions may be reasonably considered as separable into independent factors as $$\sigma_{RND}(y,t)=\sigma_{RND}^{[space]}(y)\times\sigma_{RND}^{[time]}(t) \text{ and } \sigma_{FPN}(y,t)=\sigma_{FPN}^{[space]}(y)\times\sigma_{FPN}^{[time]}(t).$$

In addition, while $\sigma_{RND}$ can be further decomposed into a vertical and a horizontal component, such an anisotropy in noise may be embedded in PSD representations of noise in various embodiments, as further described herein.

It may be noted that some "bad pixels" (e.g., stuck pixels that always show a fixed value or dead pixels that never detect light) may result in impulse noise of extremely low probability, and thus may not be adequately captured by equation 1. However, various embodiments of the disclosure contemplate incorporating simple mean/median operations based on a look-up table or other inexpensive ad-hoc procedures to compensate for such cases.

Figure 4:
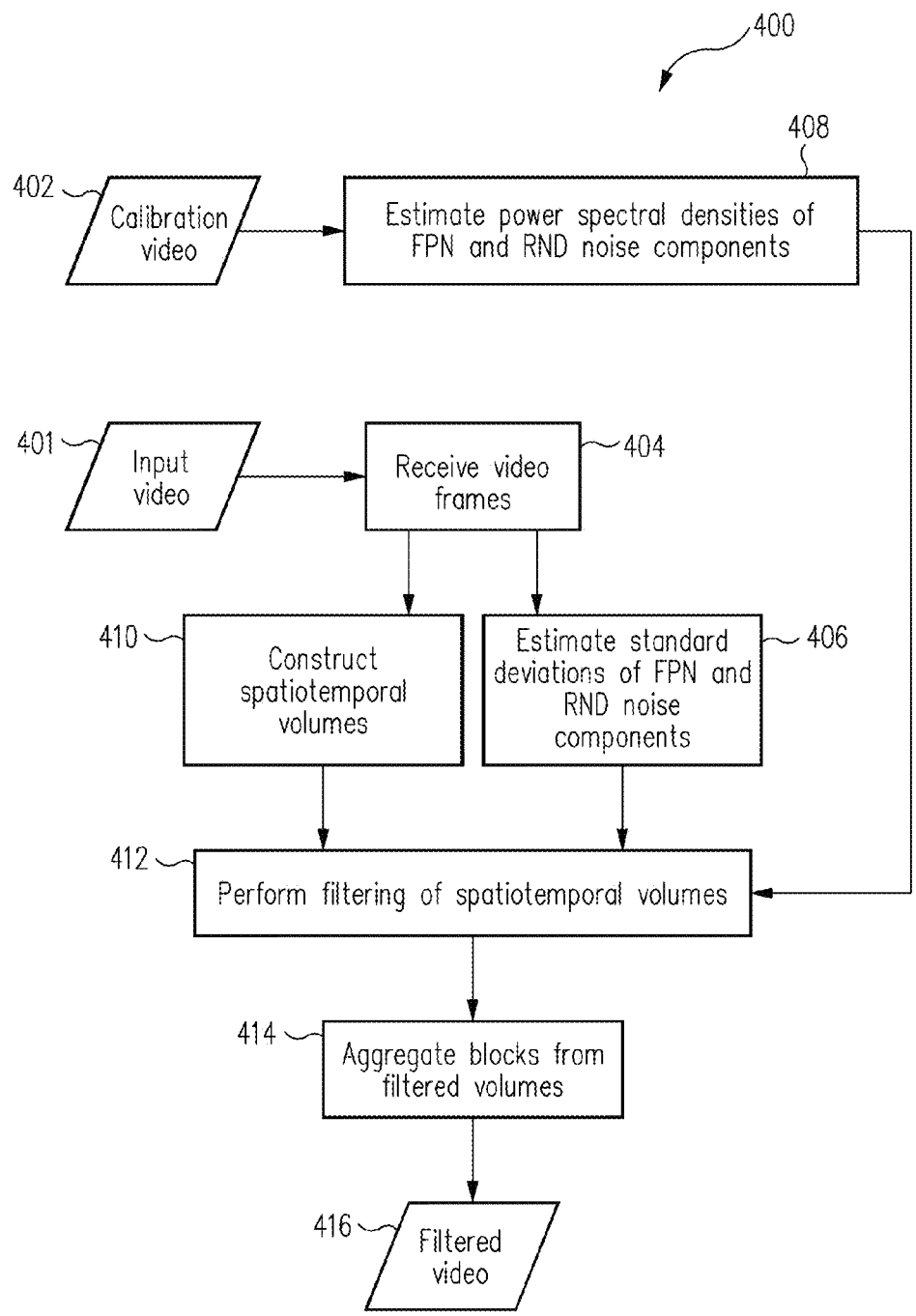
FIG. 4 illustrates a flowchart of a process to suppress noise in video images in accordance with an embodiment of the disclosure.

Having described example noise models and associated noise parameters, such as standard deviation $\sigma_{RND}$, standard deviation $\sigma_{FPN}$, PSD of $\eta_{RND}$, and PSD of $\eta_{FPN}$, that may be utilized in various embodiments of systems and methods of the disclosure, a process 400 to suppress noise in video data in accordance with an embodiment of the disclosure will now be described in connection with FIG. 4. For example, process 400 may be performed by various embodiments of system 100. It should be appreciated that system 100 and various components thereof are identified only for purposes of example, and that any other suitable system may be utilized to perform all or part of process 400.

At operation 404, a plurality of video image frames (e.g., consecutive still images that may be composed to construct moving videos) may be received. For example, video image data (e.g., input video 401) captured or otherwise generated by image capture component 130 or external devices (e.g., generating video data 132) may be received at video interface component 134 and/or processing component 110. In some embodiments, video image data may be processed or otherwise managed to extract a plurality of video image frames therefrom, as needed or desired for particular applications or requirements. For example, video interface component 134 and/or processing component 110 may be configured to extract a plurality of video image frames, which may then be received at processor 110.

At operation 406, standard deviation $\sigma_{RND}$ of random noise component and standard deviation $\sigma_{FPN}$ of FPN component may be estimated using the video image frames. For example, standard deviation $\sigma_{RND}$ of random noise component and standard deviation $\sigma_{FPN}$ of FPN component may be computed, calculated, approximated, or otherwise estimated at processing component 110 of FIG. 1. As discussed above, such parameters may be estimated only sporadically, for example, after filtering or otherwise processing a certain number of video image frames. As such, standard deviation estimation operations may be used within a real-time image processing pipeline if desired. In one embodiment, standard deviation estimation operations may be embedded within, for example, noise filtering module 112. In another embodiment, standard deviation estimation operations may be implemented in a standalone module.

In various embodiments, standard deviation $\sigma_{RND}$ of random noise component may be estimated by performing a temporal high-pass filtering of the video, and calculating a median of absolute deviations (MAD) of the temporal high-pass version of the video. For example, in one embodiment, temporal high-pass filtering may be performed by obtaining the differences between one video image frame and another video image frame delayed by one frame. MAD calculations may then be performed on the temporal high-pass version of the video to obtain a robust estimation of standard deviation $\sigma_{RND}$. In other embodiments, standard deviation $\sigma_{RND}$ may be estimated in a three-dimensional (3-D) transform domain (e.g., transformed by applying a decorrelating transform for filtering as further described herein), where coefficients representing the highest temporal frequency, or some frequency higher than a threshold value, may be used as samples for MAD calculation. It is also contemplated that other known methods for temporal high-pass filtering of video image data and/or other known methods for estimating a standard deviation, may be adapted to be used with process 400.

In various embodiments, standard deviation $\sigma_{FPN}$ may be obtained from the estimated standard deviation $\sigma_{RND}$ and an estimation of total standard deviation of both FPN and random noise components. In one embodiment, standard deviation $\sigma_{FPN}$ may be computed as:

$$\sigma_{FPN}^2=\sigma_{RND+FPN}^2-\sigma_{RND}^2, \quad \text{(Equation 9)}$$

wherein $\sigma_{RND+FPN}$ is a total standard deviation of both FPN and random components. In other embodiments, standard deviation $\sigma_{FPN}$ may be computed using other statistical criteria (e.g., maximum-likelihood) for estimating standard deviation $\sigma_{FPN}$ given standard deviation $\sigma_{RND+FPN}$ and standard deviation $\sigma_{RND}$.

In various embodiments, total standard deviation $\sigma_{RND+FPN}$ may be estimated by performing a spatial high-pass filtering of the video, and calculating a MAD of the spatial high-pass version of the video. For example, in one embodiment, spatial high-pass filtering may be performed by obtaining the differences between a video image frame and the video image frame shifted by one pixel. MAD calculations may then be performed on the spatial high-pass version of the video to obtain a robust estimation of standard deviation $\sigma_{RND+FPN}$, which in turn can be used to obtain a robust estimation of $\sigma_{FPN}$ as described above. In other embodiments, standard deviation $\sigma_{RND+FPN}$ may be estimated in a three-dimensional transform domain (e.g., transformed using a decorrelating transform for filtering as further described herein), where coefficients representing the highest spatial frequency, or some frequency higher than a threshold value, may be used as samples for MAD calculation. It is also contemplated that other known methods for spatial high-pass filtering of video image data and/or other known methods for estimating a standard deviation, may be adapted to be used with process 400.

At operation 408, power spectral densities (PSD) of a random noise component $\eta_{RND}$ and a FPN component $\eta_{FPN}$ may be estimated using calibration video 402 or any other video images that may be used for calibration purposes. As discussed above, PSDs of $\eta_{RND}$ and $\eta_{FPN}$ may be considered to be constant modulus normalization of $\sigma_{RND}$ and $\sigma_{FPN}$. As such, in some embodiments, operation 408 may be performed offline and/or only periodically (e.g., when recalibration may be desired or needed). In some embodiments, calibration video 402 may provide substantially uniform video images (e.g., provided by capturing images of a closed shutter, a substantially uniform blackbody, a substantially uniform background, or other similar images) such that noise present in calibration video 402 may be more effectively distinguished from true images. In other embodiments, estimation of PSDs may be performed using any video that contains noise distributed and correlated as typical for an image sensor that captures video images to be filtered by process 400.

In some embodiments, PSDs of a random noise component $\eta_{RND}$ and a FPN component $\eta_{FPN}$ may be computed by performing an autocorrelation operation on calibration video 402. In other embodiments, other suitable techniques for computing PSDs may be adapted to be used for operation 408.

In some embodiments, an actual pattern of FPN in the video image frames may be dynamically estimated, in addition to or in place of various statistical parameters associated with the FPN (e.g., a PSD $\eta_{FPN}$ and a standard deviation $\sigma_{FPN}$ of the FPN estimated as described herein). For one or more embodiments, the dynamically estimated FPN pattern may be subtracted from the video image frames, and from the resulting video image frames a PSD of the residual FPN (e.g., FPN remaining in the video image frames after the dynamically estimated FPN pattern is subtracted) and/or other noise may be estimated online (e.g., using the received video image frames) as opposed to being estimated offline (e.g., using calibration video 402). Such online estimation of the PSD of the residual FPN or other noise may enable noise filtering that is robust against modeling imprecisions and inaccuracies, for example.

At operation 410, spatiotemporal volumes (e.g., containing image blocks extracted from different temporal positions, such as from different video image frames) may be constructed from image blocks (e.g., image patches such as fixed-size patches or portions of a video image frame) extracted from video image frames. In various aspects of process 400, filtering and/or other processing operations may be performed on the constructed spatiotemporal volumes.

In various embodiments, spatiotemporal volumes may be constructed by extracting and stacking together image blocks from a sequence of video image frames along a motion trajectory. For example, if 8×8 image blocks are utilized in an embodiment, the constructed spatiotemporal volume may have size 8×8×N, where N is a length of a trajectory (e.g., a number of video image frames) along which motion is tracked. In some embodiments, motion trajectories may be determined by concatenating motion vectors obtained by, for example, block-matching techniques or any other suitable motion or optical flow estimation techniques. Motion vectors may be either computed from the received video image frames, or, when input video 401 is a coded video, motion vectors embedded in the coded video may be utilized. In some embodiments, the motion vectors may be utilized to assess the quality of various dynamic (e.g., instantaneous or online) estimates associated with FPN described above.

Figure 5:
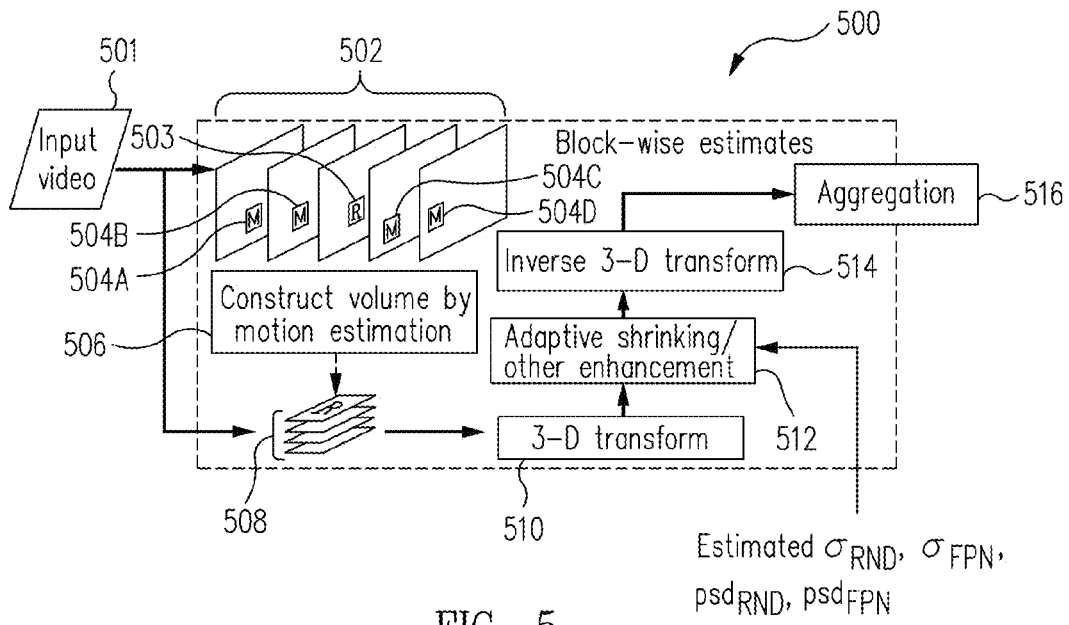
FIG. 5 illustrates a flowchart of a process to construct and filter spatiotemporal volumes to suppress noise in video images in accordance with an embodiment of the disclosure.
Figure 6:
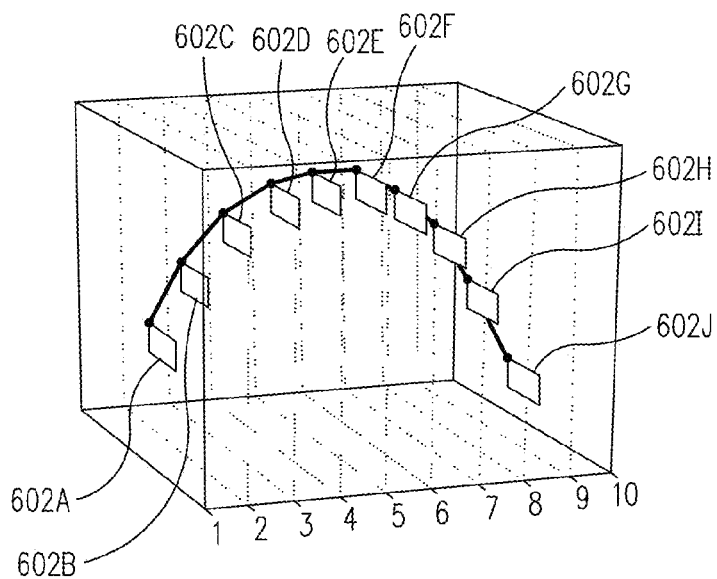
FIG. 6 illustrates an example of a motion trajectory along which image blocks may be extracted to construct a spatiotemporal volume in accordance with an embodiment of the disclosure.

Briefly referring to FIGS. 5 and 6, examples of constructing spatiotemporal volumes are further described. FIG. 5 shows a process 500 to construct and filter a spatiotemporal volume 508 to suppress noise in an input video 501 in accordance with an embodiment of the disclosure. For example, process 500 may be performed as part of process 400 of FIG. 4, such as at operations 410-414. FIG. 6 shows an example of a motion trajectory along which image blocks are extracted to construct a spatiotemporal volume in accordance with an embodiment of the disclosure.

As described above, block-matching techniques may be used in some embodiments to construct spatiotemporal volumes. For example, at operation 506, spatiotemporal volume 508 may be constructed using a block-matching technique. That is, a plurality of video image frames 502 may be examined to search for image blocks 504A-504D matching (e.g., meeting a certain similarity criterion) a reference image block 503. Such image blocks 503, 504A-504D may define a motion trajectory, and may be stacked together to construct spatiotemporal volume 508. Note that operations enclosed in the dashed line (e.g., including operations 506, 510-514) may be repeated for each reference image block to construct and filter a plurality of spatiotemporal volumes. In another example, image blocks 602A-602J in FIG. 6 may be selected as defining a motion trajectory using various motion estimation techniques. As such, images blocks 602A-602J may be extracted and stacked together to form a spatiotemporal volume of length 10, for example.

As can be seen in FIGS. 5 and 6, a spatiotemporal volume may comprise image blocks that may correspond to various different spatial positions on a video image. In such a case, FPN may appear substantially as random noise (e.g., not fixed to specific pixel positions because image block positions change), which may allow FPN to be modeled and filtered as such. If, however, there is little or no motion, all or a substantial portion of FPN may be preserved in the spatiotemporal volume, and as such, may be filtered based substantially on noise parameters associated with FPN. Thus, how much of FPN may be captured as random noise or preserved as FPN in spatiotemporal volumes may depend on the relative alignment of image blocks (e.g., how many of the image blocks in a spatiotemporal volume are aligned and how many of them are from other spatial locations).

Referring back to FIG. 4, at operation 412, the constructed spatiotemporal volumes may be filtered (e.g., to suppress noise or to perform other processing as further described herein with regard to operation 512). In various embodiments, the filtering may be based at least in part on one or more noise parameters. For example, in some embodiments, the filtering may be based at least in part on standard deviation $\sigma_{RND}$ of a random noise component, standard deviation $\sigma_{FPN}$ of a FPN component, PSD of a random noise component, and/or PSD of a FPN component, any one of which may be computed, calculated, approximated, or otherwise estimated at operations 406 and 408. In some embodiments, the filtering may be further adaptive to other characteristics of the constructed spatiotemporal volumes, as further described herein.

In some embodiments, filtering may be performed on 3-D transform domain representations (which may also be referred to as 3-D spectra) of the spatiotemporal volumes. For example, referring again to FIG. 5, filtering operations may include applying a three-dimensional (3-D) transform to the spatiotemporal volumes to obtain 3-D spectra (e.g., at operation 510), modifying (e.g., adaptively shrinking) coefficients of the 3-D spectra (e.g., at operation 512), and applying an inverse transform to obtain filtered spatiotemporal volumes (e.g., at operation 514). It is also contemplated that other forms of regularization such as weighted averaging or diffusion may be performed in place of or in addition to operations 510-514.

More specifically, at operation 510, a decorrelating 3-D transform may be applied to the spatiotemporal volumes. Such a decorrelating 3-D transform may include a discrete cosine transform (DCT), discrete sine transform (DST), discrete wavelet transform (DWT), discrete Fourier transform (DFT), or any other appropriate transform (e.g., separable, orthogonal transforms) that typically decorrelate image signals. In one embodiment, a DCT may be utilized for the transform operation.

A decorrelating 3-D transform may be applied by a separable cascaded composition of lower dimensional transforms. For example, for spatial decorrelation, a 2-D transform (e.g., a separable DCT of size 8×8) may be applied to each of the image blocks (e.g., having a size of 8×8) stacked in the spatiotemporal volume, and for the temporal decorrelation, a 1-D transform of length N (e.g., a 1-D DCT of length matching the length of the spatiotemporal volume) may be applied. As may be appreciated by one skilled in the art, the order of these two cascaded transforms may be reversed, leading to an identical result.

Figure 7:
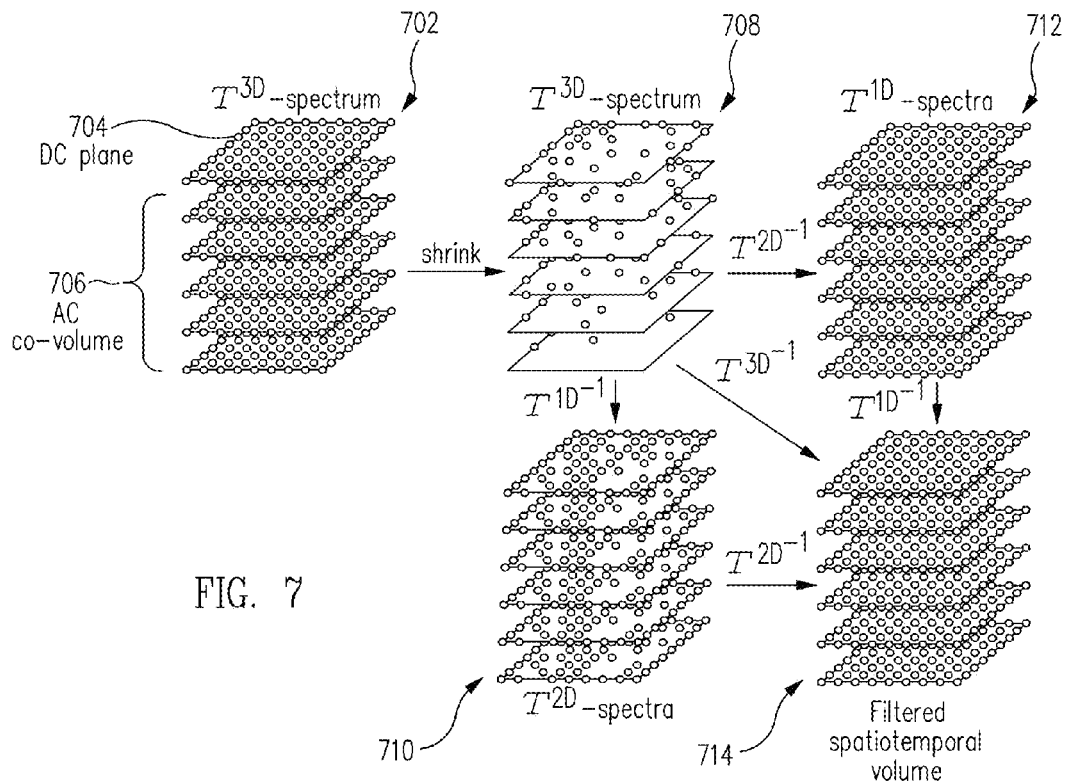
FIG. 7 illustrates a visual representation of filtering on a three dimensional (3-D) spectrum of a spatiotemporal volume in accordance with an embodiment of the disclosure.
Figure 8:
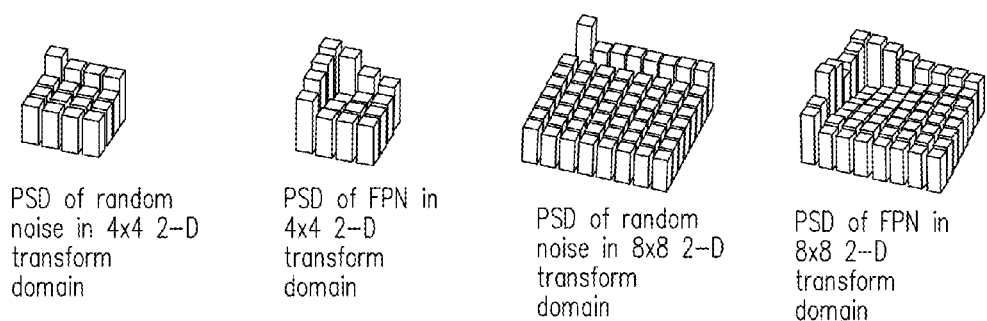
FIG. 8 illustrates various two-dimensional (2-D) transform representations of examples of power spectral densities of random noise and FPN components in accordance with an embodiment of the disclosure.

Referring also to FIG. 7, a resulting 3-D spectrum 702 may comprise a plurality of spectral coefficients (shown as small circles in FIG. 7) representing the spatiotemporal volume in the 3-D transform domain. 3-D spectrum 702 may also include a direct current (DC) plane 704 and an alternating current (AC) co-volume 706. DC plane 704 may be viewed as a collection of DC-terms, which may refer to transform domain coefficients that correspond to zero frequency and may represent an averaging of values. In this regard, the DC-terms in DC plane 704 may encode information about the FPN component. As such, in some embodiments, filtering operations may be adjusted based on which plane (e.g., DC plane or AC co-volume) the coefficients belong to, as further described herein. AC co-volume 706 may be viewed as other remaining coefficients, which typically satisfy some type of orthogonal relationship with the coefficients in DC-plane 704. It should be noted that FIG. 7 is merely a visual presentation provided for purposes of explaining filtering operations on a 3-d spectrum, and as such, the depiction of the location, size, and/or shape of 3-D spectrum 702, DC plane 704, AC co-volume 706 should not be understood as limiting a resulting 3-D spectrum.

At operation 512 of FIG. 5, shrinking (or shrinkage) may be performed to modify the coefficients of the 3-D spectrum (e.g., 3-D spectrum 702), thereby obtaining a shrunk 3-D spectrum 708. Shrinking may include thresholding (e.g., hard thresholding, soft thresholding, or others), scaling, Wiener filtering, or other operations suitable for regularizing signals in a transform domain. In various embodiments, shrinking modifies the spectral coefficients based on corresponding coefficient standard deviations of noise that may be embedded in each spectral coefficient. Thus, for example, in one embodiment, shrinking may be performed by hard thresholding the spectral coefficients based on the corresponding coefficient standard deviations (e.g., setting a value to 0 if it does not meet a threshold value). In another example, shrinking may be performed in two or more stages, in which thresholding may be performed in earlier stages to provide an estimate to Wiener filtering performed in later stages.

The coefficient standard deviation may be approximated, calculated, or otherwise obtained based on various parameters associated with a random noise component and a FPN component that may be present in video images. For example, in one embodiment, the coefficient standard deviation may be approximated based at least in part on standard deviation $\sigma_{RND}$ of a random noise component and standard deviation $\sigma_{FPN}$ of a FPN component.

In another embodiment, the coefficient standard deviation may be approximated based further on a PSD of a random noise component and a PSD of a FPN component, in addition to standard deviation $\sigma_{RND}$ and standard deviation $\sigma_{FPN}$. As described above with respect to modeling of noise in FIGS. 2A-3B and equations 1-5, these PSDs may encode correlation or structure of the noise components. Thus, if computed with respect to the 2-D transform used for spatial decorrelation, these PSDs may additionally provide variances of the random noise component and the FPN component for each of the coefficients in the 2-D spectra prior to the application of the 1-D transform for temporal decorrelation. Such properties of the PSDs may be better visualized or understood through FIG. 8, which shows example graphical representations of PSDs of random noise and FPN components computed with respect to a 2-D transform used for spatial decorrelation.

In various embodiments, one or more of these and other noise parameters may be based on estimated values (e.g., estimated online and/or offline as part of process 400). For example, the coefficient standard deviation may be approximated based on standard deviation $\sigma_{RND}$, standard deviation $\sigma_{FPN}$, a PSD of random noise component and/or a PSD of a FPN component, all or some of which may be estimated values obtained through operations 406 and 408 of FIG. 4 described above.

The coefficient standard deviations may be further adapted, refined, or otherwise adjusted based on the motion captured in the spatiotemporal volumes, in addition to being approximated or calculated based on noise parameters as discussed above. That is, in accordance with various embodiments of the disclosure, it has been observed that the relative alignment of image blocks grouped in spatiotemporal volumes affects how a FPN component is manifested in spectral coefficients. For example, in one extreme case in which all image blocks are aligned (e.g., when there is no motion), the FPN component may be same across all image blocks. As such, the FPN component may simply accumulate through averaging, and thus constitute a substantial part of the content, rather than noise, of the DC plane in the 3-D spectrum. In the other extreme case in which all image blocks are from various different spatial positions of video images, the FPN component may present different patterns over the different image blocks. As such, restricted to the spatiotemporal volume, the FPN component may appear as another random noise component.

Accordingly, in some embodiments, the coefficient standard deviations may not only be approximated based on the noise parameters, but they may also be adapted, refined, or otherwise adjusted based further on the size of the spatiotemporal volume, the relative spatial alignment of images blocks associated with the spatiotemporal volume, and/or the position of coefficients within the 3-D spectrum (e.g., whether the coefficients lie on the DC plane or the AC co-volume). In one embodiment, such an adaptive approximation of the coefficient standard deviations may be obtained using a formulation that encompasses the two extreme cases and at the same time offers a gradual transition for intermediate cases.

One example of such a formulation may be described formally as follows. For a spatiotemporal volume of temporal length N, let $L_n \leq N$, $1 \leq n \leq N$, be the number of image blocks forming the spatiotemporal volume sharing the same original spatial position as the n-th block in the volume. Let $L = \max_{1 \leq n \leq N}\{L_n\}$ (an alternative different definition, which can be more practical depending on the specific filter implementation, may be $L=L_1$). The coefficient standard deviations may then be approximated, for the coefficients in the temporal DC plane and its complementary AC co-volume as:

$$\sigma_{DC} = \sqrt{\sigma_{RND}^2 psd_{RND}^{2DT} + \frac{L^2 + N - L}{N}\sigma_{FPN}^2 psd_{FPN}^{2DT}}, \quad \text{(Equation 10)}$$

$$\sigma_{AC} = \sqrt{\sigma_{RND}^2 psd_{RND}^{2DT} + \frac{N - L}{N}\sigma_{FPN}^2 psd_{FPN}^{2DT}}, \quad \text{(Equation 11)}$$

wherein $\sigma_{DC}$ and $\sigma_{AC}$ are the coefficient standard deviations for coefficients in the DC plane and in the AC co-volume, respectively, and wherein $psd_{RND}^{2DT}$ and $psd_{FPN}^{2DT}$ are the PSDs of FPN and random noise components with respect to the 2-D spatial decorrelating transform. Thus, by modifying the spectral coefficients using $\sigma_{DC}$ and $\sigma_{AC}$ obtained from equations 10 and 11, an embodiment of the disclosure may perform adaptive shrinking that may permit near-optimal filtering of noise in video images. Note that the abovementioned extreme cases are obtained in equations 10 and 11 with L=N (no motion) or L=0 (image blocks all from different spatial positions), respectively.

Further, at operation 512, other operations may also be performed on the shrunk 3-D spectra (e.g., shrunk 3-D spectrum 708) for further processing or manipulation. For example, in one embodiment, the spectral coefficients may be further modified using collaborative α-rooting or other techniques that sharpen and/or enhance the contrast in images by boosting appropriate ones of the spectral coefficients. In other examples, image restoration, deblurring, sharpening, equalization, super-resolution, or other operations may be performed to further modify the coefficients of the shrunk 3-D spectra. Whereas inaccurately modeled and/or sub-optimally suppressed noise often render enhancement and other operations ineffective, or worse, cause enhancement and other operations to degrade rather than improve images, near-optimal suppression of noise that may be achieved by embodiments of the disclosure may beneficially improve the efficacy of enhancement and other operations, as further illustrated herein.

At operation 514, the inverse of the decorrelating 3-D transform may be applied to the shrunk 3-D spectra to obtain filtered spatiotemporal volumes (e.g., a filtered spatiotemporal volume 714). As shown in FIG. 7, cascaded separable inverse 2-D and 1-D transforms may be applied in any order (e.g., with intermediate 2-D spectra 710 or intermediate 1-D spectra 712) to obtain filtered spatiotemporal volume 714.

At operation 414/516, image blocks from the filtered spatiotemporal volumes may be aggregated using appropriate aggregation techniques to generate filtered video image frames (e.g., filtered video 416). For example, in various embodiments, aggregation may include weighted averaging of image blocks. In some embodiments, weights for averaging may be based in part on the coefficient standard deviation. In such embodiments, the aggregating operation may benefit from the adaptive approximation of the coefficient standard deviations described above for operation 512. It may be appreciated that other operations associated with processes 400 and 500 may also benefit from the adaptivity provided by embodiments of the disclosure, if such operations are based in part on the coefficient standard deviations.

Figure 9:
FIG. 9 illustrates an example of an input video image frame captured by an infrared imaging sensor in accordance with an embodiment of the disclosure.

Referring now to FIG. 9-11B, examples of advantageous results that may be obtained by embodiments of the disclosure are illustrated and compared with results obtained by conventional techniques. FIG. 9 shows an example of an input video image frame captured by an infrared imaging sensor. The input video image frame of FIG. 9 exhibits both correlated random noise and correlated FPN. FIG. 10A shows an example of a resulting video image frame obtained by processing the input video image of FIG. 9 using a conventional noise filtering technique. More specifically, the conventional technique utilized to obtain FIG. 10A assumes conventional additive white Gaussian noise (AWGN) model. That is, unlike various embodiments of the disclosure, there is no modeling of noise correlation/structure or modeling of separate FPN and random noise components. In FIG. 10A, this leads to ineffective noise suppression, with residual FPN and visible structured artifacts clearly visible from the resulting video image frame.

Figure 10A:
FIG. 10A illustrates an example of a resulting video image frame filtered using a conventional technique.
Figure 10B:
FIG. 10B illustrates an example of a resulting video image frame filtered and enhanced using a conventional technique.

Furthermore, in an example in FIG. 10B of a resulting video image frame obtained by filtering and enhancing the input video image frame of FIG. 9 using conventional techniques, performing an enhancement (e.g., sharpening and/or contrast enhancement) operation on the conventionally filtered video image frame lead to a degradation, rather than an improvement, of the video image frame, with noise being exacerbated rather than being attenuated.

Figure 11A:
FIG. 11A illustrates an example of a resulting video image frame filtered in accordance with an embodiment of the disclosure.
Figure 11B:
FIG. 11B illustrates an example of a resulting video image frame filtered and enhanced in accordance with an embodiment of the disclosure.

In contrast, in an example in FIG. 11A of a resulting filtered video image frame obtained by filtering the input video image of FIG. 9 according to an embodiment of the disclosure, both FPN and random noise components are effectively suppressed with no structured artifacts in the resulting video image. Further, advantages of accurate modeling and filtering of noise may be appreciated even more in FIG. 11B, which shows an example of a resulting video image frame obtained by filtering and enhancing the input video image of FIG. 9 in accordance with an embodiment of the disclosure.

Therefore, some embodiments of methods and systems disclosed herein may permit effective suppression of noise even in images that have a prominent FPN component, by modeling noise more accurately, estimating one or more noise parameters, filtering images based on motion-adaptive parameters, and/or performing other operations described herein. Some embodiments of methods and systems disclosed herein may also beneficially suppress residual FPN that may still remain after conventional FPN compensation procedures, such as a column noise compensation technique, FPN removal based on pre-calibrated or dynamically estimated FPN masks, and/or other techniques, have been performed. Thus, for example, some embodiments of methods and systems disclosed herein may be included in or implemented as various devices and systems that capture and/or process video or still images impaired by noise (e.g., video or still images captured by infrared image sensors or other sensors operating at a low signal-to-noise ratio regime, and/or video or still images processed by conventional FPN compensation techniques) to beneficially improve image quality.

Based on the framework of constructing and adaptively operating on motion-based spatiotemporal volumes, additional embodiments of the disclosure may advantageously reduce, remove, or otherwise suppress distortion and/or degradation in images (e.g., distortion and/or degradation caused by atmospheric turbulence), in addition to or in place of suppressing random and fixed pattern noise in images. As briefly discussed above, images (e.g., still and video image frames) captured by an imaging system, such as system 100, may contain distortion and/or degradation such as those caused by atmospheric turbulence as light travels through the air from a scene to an imaging sensor of the imaging system.

Figure 12:
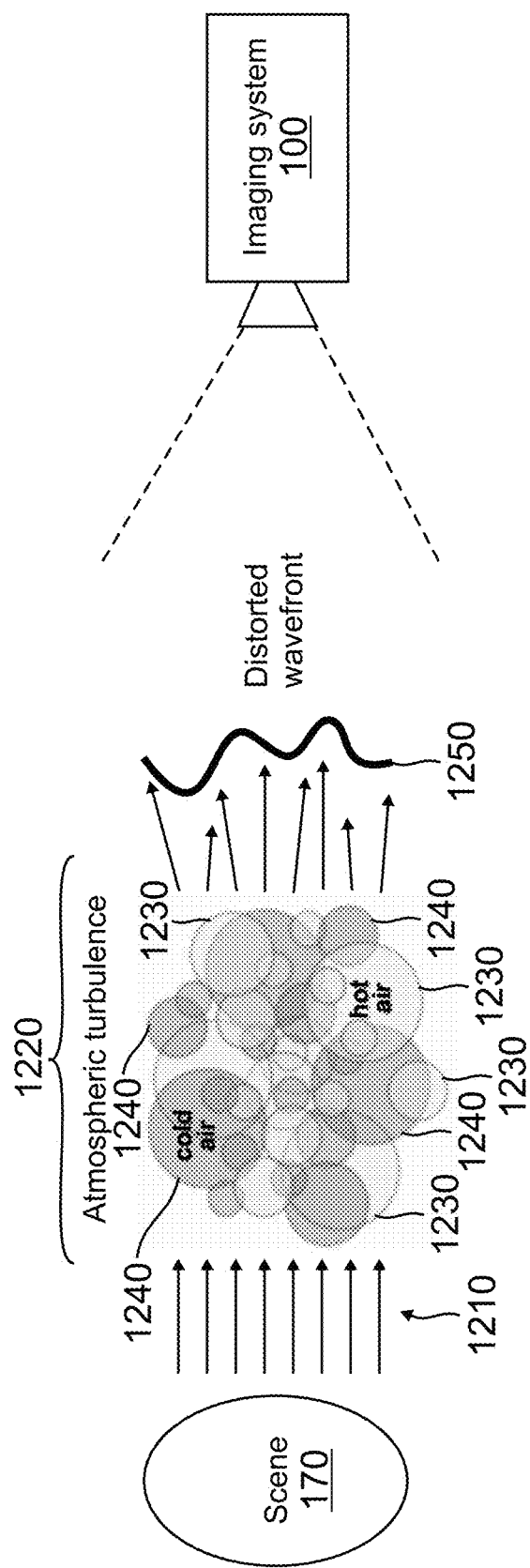
FIG. 12 illustrates how light from a scene may be distorted due to turbulent air before reaching an imaging sensor in accordance with an embodiment of the disclosure.

For example, as illustrated by FIG. 12 according to an embodiment of the disclosure, light 1210 (e.g., visible light, infrared light, ultraviolet light, or light in other wavebands detectable by image capture component 130) from scene 170 may travel through turbulent air 1220 (e.g., occurring due to mixing of hot air pockets 1230 and cold air pockets 1240 as shown in FIG. 12, air flow disturbance around floating particles, or other natural or man-made phenomena) before it reaches imaging component 130 of imaging system 100 (e.g., a visible light and/or infrared video camera). Thus, for example, variation in the refractive index of turbulent air 1220 cause the light wavefront 1250 to distort, leading to degradation and/or distortion in images captured by imaging system 100, which may particularly be visible in outdoor and/or long-distance image acquisition.

Such degradation and/or distortion appearing in captured images due to atmospheric turbulence may include, for example, image blurs that randomly vary in space (e.g., at different spatial pixel locations) and in time (e.g., from frame to frame), large-magnitude shifts/displacements (also referred to as "dancing") of image patches that also randomly vary in space and time (i.e. different shift for different patches and in different frames), and/or random geometrical distortion (also referred to as "random warping") of captured images of objects. Such degradation and/or distortion may occur in addition to the random and fixed pattern noise discussed above and blurring due to camera optics.

In accordance with one or more embodiments of the disclosure, such degradation and/or distortion appearing in captured images due to atmospheric turbulence may be mathematically modeled through randomly varying point-spread functions (PSFs), treating each point in an ideal image as being shifted and blurred with a PSF. In one non-limiting example for purposes of illustrating various techniques of the disclosure, an observed noisy, blurred, and turbulent video z (or a sequence of still images) may be modeled as follows:

Let $y: \mathbb{R}^2 \times \mathbb{R} \to \mathbb{R}$ be the true noise-free, blur-free, and turbulence-free video, $x \in \mathbb{R}^2$ be a spatial coordinate, and $t \in \mathbb{R}$ be a temporal coordinate. An observed noisy, blurred, and turbulent video z can then be approximately expressed in the linear integral form $$z(x, t) = \int_{\mathbb{R}^2} \left( \int_{\mathbb{R}^2} y(v - u, t) h_{atmo}(u - \xi(v, t)) \, du \right) h_{lens}(x - v) \, dv + \varepsilon(x, t), \quad \text{(Equation 12)}$$

$$x \in \mathbb{R}^2, t \in \mathbb{R}$$

where $h_{atmo}: \mathbb{R}^2 \to \mathbb{R}$ and $h_{lens}: \mathbb{R}^2 \to \mathbb{R}$ are a pair of atmospheric and optical PSFs, and $\xi: \mathbb{R}^2 \times \mathbb{R} \to \mathbb{R}$ and $\varepsilon: \mathbb{R}^2 \times \mathbb{R} \to \mathbb{R}$ are random fields. In particular, $\xi$ models the random displacements due to distorted light propagation caused by turbulent air 1220, while $\varepsilon$ can model random as well as fixed pattern noise components of imaging system 100.

If the randomness of $\xi$ is ignored and $\xi \equiv 0$ is assumed, the combined effect of $h_{atmo}$, $h_{lens}$, and $\varepsilon$ results in blurred noisy observations which can be filtered as discussed above with reference to FIGS. 4 through 8. However, for a random $\xi$, the blur is no longer convolutional. Indeed, $\xi$ causes random displacement of the PSF $h_{atmo}$. In particular, if the PSFs and noise are ignored for purposes of discussing $\xi$ (i.e. assume $h_{atmo} = h_{lens} = \delta_0$ and $\varepsilon \equiv 0$), $\xi$ can be simply seen as the displacement field that warps y onto z. Since such displacement changes randomly with time, it corresponds to "dancing" visible in turbulent video z. Various techniques discussed below in accordance with one or more embodiments of the disclosure may compensate for such "dancing" due to atmospheric turbulence, for example, by compensating for the randomness of $\xi$.

Figure 13:
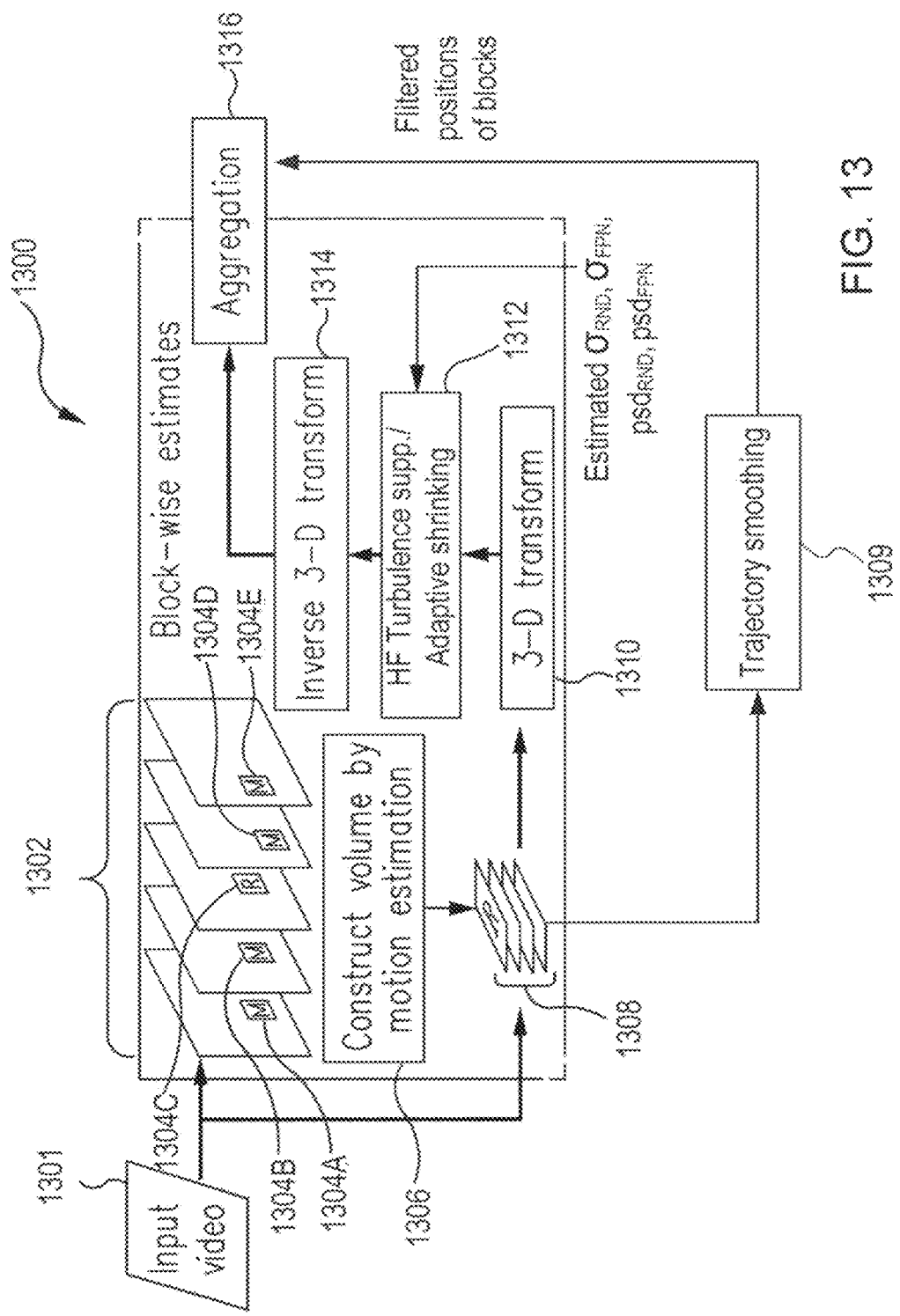
FIG. 13 illustrates a flowchart of a process to suppress distortion in images in accordance with an embodiment of the disclosure.

For example, FIG. 13 illustrates a process 1300 to suppress distortion and/or degradation due to atmospheric turbulence in an input video 1301 by constructing and operating on spatiotemporal volumes, in accordance with an embodiment of the disclosure. For embodiments illustrated with reference to FIG. 13, input video 1301 is assumed to contain distortion, degradation, or other effects due to atmospheric turbulence as discussed above with reference to FIG. 12, and process 1300 includes additional or alternative operations to filter the positions (e.g., the coordinates within input video 1301) of the image blocks (e.g., blocks 1304A-1304E) inside a spatiotemporal volume (e.g., a spatiotemporal volume 1308) and/or to process the spatiotemporal volume (e.g. by performing alpha-rooting or other techniques on the coefficients of the 3-D spectrum obtained by transforming spatiotemporal volume 1308) to compensate for the randomness of $\xi$ as further discussed herein, but may otherwise be similar to process 500.

Thus, at operation 1306 of process 1300, spatiotemporal volume 1308 may be constructed by tracking similar blocks (e.g., patches) 1304A through 1304E in a sequence of video image frames 1302 of input video 1301, as discussed above for operation 410 of process 400 and operation 506 of process 500. In this regard, motion is defined through an overcomplete block-wise tracking, in contrast to some conventional techniques that define a deformation field or an optical flow that would track the motion of each pixel in time. That is, according to embodiments of the disclosure, each pixel simultaneously belongs to multiple spatiotemporal volumes, each of which can follow different trajectories and is subject separate trajectory smoothing and spectral filtering operations as further described below. As such, each pixel in an output video of process 1300 is obtained from combining various pixels from different original positions in input video 1301, and each pixel in the input turbulent video may follow multiple trajectories and contribute to multiple pixels at different positions in the output video.

In some embodiments, such tracking may be based on a multiscale motion estimation. As an example for such embodiments, matching and tracking of similar image blocks may be performed in a coarse-to-fine manner, such that the matching and tracking of image blocks may start at a coarse scale (e.g., a large blocks/patches) and repeated at finer and finer scales (e.g., a smaller blocks/patches), with matches obtained for a coarser scale being used as prediction for a finer scale where the match results may be refined. In this manner, matching and tracking of similar image blocks may be performed even in the presence of deformations and blur (e.g., due to atmospheric turbulence) and heavy noise in input video 1301, thereby effectively tracking moving objects (e.g., including parts of objects enclosed in a block) as well as stationary objects, for example.

In addition to constructing spatiotemporal volumes by extracting and stacking together the contents of image blocks along the tracked motion trajectory at operation 1306, process 1300 at operation 1309 includes extracting and filtering the positions (e.g., coordinates) of the image blocks along the tracked motion to compensate for shifts or "dancing" (e.g., the randomness of $\xi$) due to atmospheric turbulence. Such filtering of the positions may also be referred to herein as "trajectory smoothing."

Figure 14:
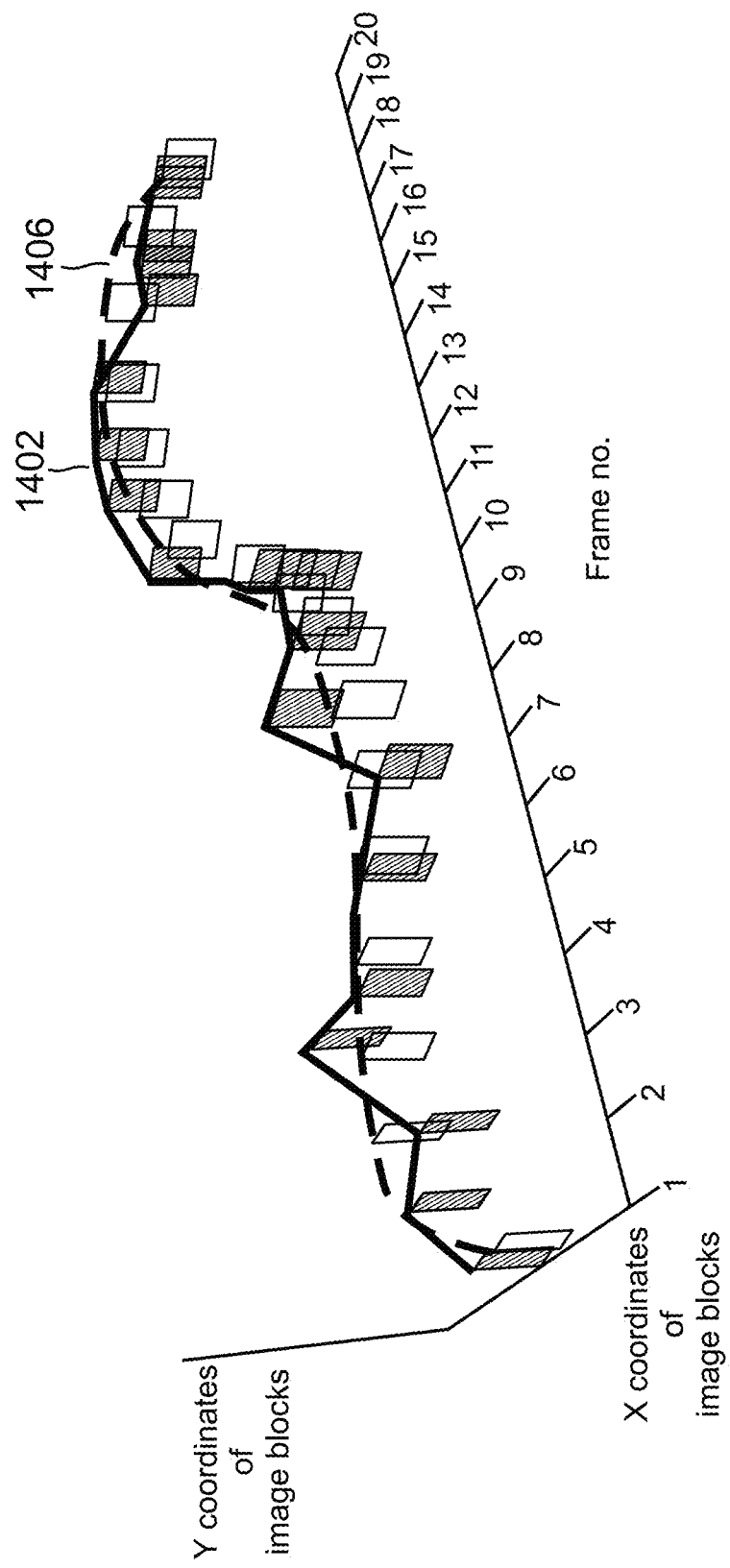
FIG. 14 illustrates a graph of image block motion trajectories in accordance with an embodiment of the disclosure.

Referring also to FIG. 14, an example result of trajectory smoothing is illustrated in accordance with an embodiment of the disclosure. In FIG. 14, a trajectory 1402 (also referred to as extracted trajectory 1402) is drawn to connect the positions of example image blocks (shown as shaded blocks in FIG. 14) that are extracted along the tracked motion trajectory from a sequence of input video image frames at operation 1306. As shown, extracted trajectory 1402 may appear jagged due to random displacements or shifts (e.g., modeled by ξ in equation 12 above) caused by turbulent air 1220. According to embodiments of the disclosure, the positions (coordinate x) of such extracted image blocks may be modeled as:

$$\tilde{x}(t) = x(t) + \xi(t), \quad \text{(Equation 13)}$$

where t is the temporal coordinate, $\tilde{x}(t)$ is the observed position of a block extracted from turbulent input video 1301 at t, x(t) is the unknown position of the block in an ideal video without turbulence, and ξ(t) is the spatial displacement (e.g., dancing) of the block due to atmospheric turbulence, which is treated as a zero-mean random variable (i.e., a position noise).

According to various embodiments, the size of image blocks/patches may be selected (e.g., a block size of 8×8 pixels chosen in some embodiments) such that the random displacement ξ(t) may capture spatial low/medium-frequency components of the effects due to atmospheric turbulence. Thus, for example, positions x(t) recovered from the observed positions $\tilde{x}(t)$ of the extracted image blocks may represent the positions of those image blocks with low/medium-frequency components of atmospheric turbulence effects suppressed. In the example of FIG. 14, the non-shaded blocks represent image blocks that are repositioned at such recovered positions x(t), with a trajectory 1406 (also referred to as smoothed trajectory 1406) drawn to connect the recovered positions x(t). As shown in FIG. 14, the example smoothed trajectory 1402 may appear smooth due to the suppression of low/medium-frequency components of random displacements or shifts in input video 1301 caused by atmospheric turbulence.

In one or more embodiments, such smoothing (e.g., filtering or reconstruction) of the trajectory of the extracted image blocks at operation 1309 may comprise performing a regression analysis (e.g., to recover the unknown positions x(t) from the observed positions $\tilde{x}(t)$ of the extracted image blocks from turbulent input video 1301), which may be an adaptive-order regression analysis in some embodiments. In such embodiments, the strength of the smoothing may be adaptive with respect to the amount of turbulence and the complexity (e.g., the order) of the underlying smooth trajectory.

Thus, for example, the adaptive-order regression according to some embodiments allows approximation of not only fixed stationary positions and linear motions with uniform velocity, but also more complex accelerated motions. In other words, in contrast to some conventional trajectory-smoothing approaches based on a uniform-motion approximation within a short temporal interval, the model of the trajectories according to some embodiments of the disclosure is full rank and the smoothing is adaptive, thereby permitting arbitrarily long spatiotemporal volumes to be constructed and very complex motion patterns to be captured and smoothed. Trajectory smoothing according to one or more embodiments of the disclosure can be used to suppress not only random dancing due to turbulence, but also more common problems such as camera shake or jitter.

In an implementation example according to some embodiments of the disclosure, the regression analysis may be performed on a complex number representation of the image block positions (e.g., coordinates), treating the spatiotemporal trajectories (e.g., the observed positions $\tilde{x}(t)$ and the unknown positions x(t)) as curves in a complex plane.

In this implementation example, the observed positions $\tilde{x}(t)$ of the extracted image blocks from turbulent input video 1301 may be represented as a complex variable:

$$\tilde{x}(t) = x_1(t) + ix_2(t) = x_1(t) + ix_2(t) + \xi_1(t) + i\xi_2(t). \quad \text{(Equation 14)}$$

Then, an adaptive-order regression analysis of the curves in a complex plane may be performed as follows, for example: Let $N_t$ be the temporal length (e.g., the length or the number of video frames along which the motion of an image block is tracked) of a spatiotemporal volume and let $P_{N_t} = \{p_k\}_{k=0}^{N_t-1}$ be a basis composed of $N_t$ complex monomials of the form $$p_k = b^k,$$
$$k = 0, \ldots, N_t - 1,$$

where $$b = \frac{1}{N_t} \begin{bmatrix} 1 \\ \vdots \\ N_t \end{bmatrix} \in \mathbb{C}^{N_t},$$

is a complex vector of length $N_t$.

Further, let $P_{N_t}^{ON} = \{p_k^{ON}\}_{k=0}^{N_t-1}$ be the orthonormal basis constructed by Gram-Schmidt orthonormalization of $P_{N_t}$. Any trajectory $\tilde{x}(t)$, $t=1, \ldots, N_t$ of length $N_t$ can be represented as a linear combination of $\{p_k^{ON}\}_{k=0}^{N_t-1}$ with complex coefficients $\{\alpha_k\}_{k=0}^{N_t-1}$ $$\tilde{x}(t) = \sum_{k=0}^{N_t-1} \alpha_k p_k^{ON}(t), \quad \text{(Equation 15)}$$

$$t = 1, \ldots, N_t,$$

where $$\alpha_k = \sum_{t=1}^{N_t} \tilde{x}(t) p_k^{ON}(t),$$

$$k = 0, \ldots, N_t - 1.$$

Filtering of the positions $\tilde{x}(t)$ of image blocks along the extracted trajectory (e.g., extracted trajectory 1402) may be performed on this representation of the positions $\tilde{x}(t)$ to perform trajectory smoothing (e.g., to obtain a smoothed trajectory, such as smoothed trajectory 1406). In this regard, in one or more embodiments, an adaptive approximation of $\tilde{x}(t)$ may be performed with respect to the orthonormal basis $P_{N_t}^{ON}$ using only the most significant coefficients $\alpha_k$. For example, the smoothed approximation $\hat{x}$ of $\tilde{x}(t)$ may be obtained as $$\hat{x}(t) = \sum_{k=0}^{N_t-1} \hat{\alpha}_k p_k^{ON}(t), \quad \text{(Equation 16)}$$

$$t = 1, \ldots, N_t,$$

where the coefficients $\hat{\alpha}_k$ are defined by shrinkage of the coefficients $\alpha_k$. Thus, in one or more embodiments, hard thresholding may be performed on the coefficients $\alpha_k$ to obtain the coefficients $\hat{\alpha}_k$ for the smoothed approximation of $\hat{x}$ of $\tilde{x}(t)$. In one specific example, the shrinkage of the coefficients $\alpha_k$ by hard thresholding may be performed as follows:

$$\hat{\alpha}_k = \begin{cases} \alpha_0 & \text{if } k = 0 \\ \alpha_k & \text{if } k > 0 \text{ and } |\alpha_k| > \lambda_{traj}\sigma_{traj}\sqrt{2\ln(N_t)} \\ 0 & \text{if } k > 0 \text{ and } |\alpha_k| \le \lambda_{traj}\sigma_{traj}\sqrt{2\ln(N_t)} \end{cases} \quad \text{(Equation 17)}$$

where $\sigma_{traj}$ is the standard deviation of the turbulence displacement $\xi$ and $\lambda_{traj} \ge 0$ is a (real valued) smoothing parameter.

Thus, the hard thresholding, and in turn the strength of the trajectory smoothing, is adaptive with respect to the amount of turbulence (e.g., depending on $\sigma_{traj}$) and the complexity (e.g., depending on the order $N_t$ for the term $\sqrt{2\ln(N_t)}$) of the underlying smooth trajectory, which, as discussed above, allows capturing and smoothing of more complex motions unlike conventional techniques. In some embodiments, the standard deviation of the turbulence displacement $\sigma_{traj}$ may be estimated online using turbulent input video 1301 (e.g., by calculating MAD as discussed above for operation 406 of process 400), determined offline (e.g., using reference data or videos), and/or otherwise provided for process 1300. In some embodiments, the smoothing parameter $\lambda_{traj}$ may be estimated online using turbulent input video 1301, determined offline, and/or otherwise provided for process 1300.

Turning to operation 1310, a 3-D transform to the constructed spatiotemporal volumes may be performed to obtain corresponding 3-D spectra, in a similar manner as discussed above for operation 510 of process 500. At operation 1312, process 1300 may process, manipulate, modify, or otherwise operate on the coefficients of 3-D spectrum coefficients to reduce or otherwise suppress at least some effects of atmospheric turbulence (e.g., blurring due to atmospheric turbulence). As discussed above for operations 1306 and 1309, spatial low/mid-frequency components of the effects of atmospheric turbulence on input video 1301 may be suppressed by the block-wise motion tracking and trajectory smoothing according to various embodiments of the disclosure. Thus, for example, some higher spatial frequency components of the atmospheric turbulence effects may remain within the content of each image block, which may be suppressed by operating on the coefficients of 3-D spectra at operation 1312.

In some embodiments, alpha-rooting (also referred to as α-rooting) of the 3-D spectrum coefficients may be performed to suppress high-frequency components of the atmospheric turbulence effects (e.g., blurring) in input video 1301. For example, softening alpha-rooting may be performed on the spatial features that are different among different blocks in a same spatiotemporal volume. As discussed above with reference to FIG. 7, spatial features that are different among different blocks in a same spatiotemporal volume may be modified by modifying the temporal-AC coefficients (e.g., the coefficients of AC co-volume 706), and thus the softening alpha-rooting may be performed on the temporal-AC coefficients to suppress high-frequency components of the atmospheric turbulence effects according to one or more embodiments.

In some embodiments, alpha-rooting of the 3-D spectrum coefficients at operation 1312 may also include sharpening alpha-rooting of the spatial features common to all image blocks in a same spatiotemporal volume to sharpen those spatial features, which may be performed by operating on the temporal-DC coefficients (e.g., the coefficients of DC plane 704). Thus, in such embodiments, contents of the image blocks may be sharpened, while at the same time suppressing the higher frequency components of atmospheric turbulence effects (e.g., blurring) in image blocks. As may be appreciated, performing different types of filtering, enhancements, or other modifications on different spectral dimension as in this example is advantageously facilitated by the structure of the constructed spatiotemporal volumes and the corresponding 3-D spectra.

As a specific example according to one or more embodiments, 3-D spectrum coefficients $\theta_i$ may be modified by taking the alpha-root of their magnitude for some $\alpha > 0$, thus modifying the differences both within and between the grouped blocks:

$$\theta_\alpha(i) = \begin{cases} \text{sign}(\theta(i)) \cdot |\theta(0)| \cdot \left|\frac{\theta(i)}{\theta(0)}\right|^{\frac{1}{\alpha}} & \text{if } \theta(0) \ne 0, \\ \theta(i) & \text{if } \theta(0) = 0, \end{cases} \quad \text{(Equation 18)}$$

where $\theta_\alpha(i)$ is the resulting alpha-rooted 3-D spectrum coefficient $\theta$, and $\theta(0)$ is the spatiotemporal DC component of the spectrum. In this representation of alpha-rooting, a value $\alpha > 1$ results in an amplification of the differences, thus sharpening, whereas $\alpha < 1$ results in an attenuation of the differences, thus softening. The neutral value $\alpha = 1$ leaves the coefficients unchanged. By employing $\alpha > 1$ for the temporal-DC coefficients (the coefficients in the temporal DC plane) and $\alpha < 1$ for the temporal-AC coefficients (the coefficients in the temporal AC co-volume), spatial sharpening of the contents on the image blocks may be achieved while at the same time producing temporal softening (which can be considered as an adaptive nonlinear alternative to the conventional temporal averaging). Since block-wise tracking to construct the spatiotemporal volumes is overcomplete and of variable length as discussed above in connection with operation 1306, the alpha-rooting or other operation to modify, manipulate, or otherwise process the coefficients of 3-D spectrum coefficients is also overcomplete and adaptive.

In some embodiments, operation 1312 may also include adaptive shrinking of the coefficients of the 3-D spectrum to suppress noise in a similar manner as described for operation 512 of process 500. In such embodiment, the 3-D spectrum coefficients $\theta_i$ to be alpha-rooted as discussed in the preceding paragraph may be coefficients that have already been shrunk by the adaptive shrinking according to one or more embodiments of the disclosure.

In some embodiments, operation 1312 may include performing known bispectrum imaging (also referred to as specking imaging) and/or lucky imaging techniques appropriately modified to work within the framework of process 1300, in addition to or in place of the alpha-rooting. In some embodiments, operation 1312 may also include further deblurring of the contents of the spatiotemporal volumes. For example, blind deblurring can be applied after the alpha-rooting to further sharpen the contents of the image blocks in the spatiotemporal volumes.

At operation 1314, the inverse of the 3-D transform may be applied to the 3-D spectra to obtain spatiotemporal volumes with higher-frequency contents of atmospheric turbulence effects suppressed (e.g., by alpha-rooting and/or otherwise operating on the 3-D spectrum coefficients at operation 1312), in a similar manner as described above for operation 514 of process 500. It is also contemplated for some embodiments that operation 1312 be performed on spatiotemporal volumes (e.g., spatiotemporal volume 1308) instead of the 3-D spectra obtained from the spatiotemporal volumes. In such embodiments, applying a 3-D transform and its inverse at operations 1310 and 1314 may be omitted.

At operation 1316, image blocks from the spatiotemporal volumes after the inverse 3-D transform may be aggregated to generate output images (e.g., output video 416) in which distortion and/or degradation in input images (e.g., input video 1301/401) due to atmospheric turbulence are reduced, removed, or otherwise suppressed. In contrast to operation 414/516 of process 400/500 where the image blocks for the spatiotemporal volumes are aggregated according to their original observed positions (e.g., observed positions x̃(t)), the image blocks are aggregated at operation 1316 according to the filtered position (e.g., approximated positions x̂(t)) obtained by trajectory smoothing at operation 1309.

Thus, in the output images the random displacement ξ(t) due to atmospheric turbulence may be suppressed. More specifically, spatial low/medium-frequency components may be suppressed by aggregating according to the filtered image block positions obtained by trajectory smoothing, and higher spatial frequency components that remain within image blocks may be suppressed by alpha-rooting or other modifications of the 3-D spectral coefficients, as discussed above for operations 1309 and 1312.

Such complementary roles of trajectory smoothing and spectral coefficient modification such as alpha-rooting may also be described as follows, for example:

Referring again to Equation 12 above, consider a square block $B_{x,t} \subset \mathbb{R}^2 \times \mathbb{R}$ of fixed size $N_b \times N_b \times 1$ centered at position x in space and at instant t in time. The average displacement $N_b^{-2} \int_{B_{x,t}} \xi(v,t)dv$, naturally corresponds to the shift between $y(B_{x,t})$ and $z(B_{x,t})$. The trajectory smoothing identifies and compensates such shift by leveraging the fact that the optical flow in the true video y should consist of smooth trajectories, whereas, because of the randomness of ξ, the optical flow in z is random.

Due to the low-pass effect given by the integral $N_b^{-2} \int_{B_{x,t}} \xi(v,t)dv$, the average displacement captures only a low spatial frequency band of the spectrum of ξ. This means that high spatial frequency bands of ξ are active within each block $z(B_{x,t})$. Appropriate alpha-rooting can be applied as discussed above to compensate for such high-frequency turbulence in effect by mimicking, within each spatiotemporal volume, a temporal averaging spatial deblurring approach.

Therefore, according to one or more embodiments of the disclosure, process 1300 may be performed by an imaging system (e.g., system 100) to suppress distortion, degradation, or other effects caused by atmospheric turbulence (e.g., by turbulent air 1220) appearing in images (e.g., input video 1301) captured by the imaging system. According to embodiments of the disclosure, sequence of images (e.g., a sequence of video frames) may be processed as a (possibly redundant and/or overlapping) collection of image blocks (or image patches). In this way, block-transform-based processing may be applied to input images corrupted by atmospheric turbulence, where each block (or patch) is tracked along time forming a spatiotemporal volume. After processing of the spatiotemporal volume in the transform domain, image blocks/patches may be moved to new estimated positions to suppress random displacement ("dancing") of the image blocks/patches. The blurring effect of atmospheric turbulence may be suppressed in the transform domain, whereas the random displacement may be suppressed by regression analysis on original observed positions of image blocks/patches in the spatiotemporal volumes.

According to various embodiments, an imaging system configured to perform process 1300 may include an infrared camera (e.g., including a thermal infrared camera), mobile digital cameras, video surveillance systems, satellite imaging systems, or any other device or system that can benefit from atmospheric turbulence suppression in captured images. For example, systems and methods to suppress atmospheric turbulence in images according to various embodiments of the disclosure may be beneficial for obtaining acceptable quality video output from sensors aimed at imaging from long distances. Furthermore, the techniques to suppress atmospheric turbulence in images according to various embodiments of the disclosure may not only be beneficial for obtaining a quality video/image output, but also for effective operations of video/image processing operations such as detection, segmentation, target identification, target tracking, scene interpretation, or other higher-level operation that can be impaired by atmospheric turbulence effects in captured images.

Figure 15A:
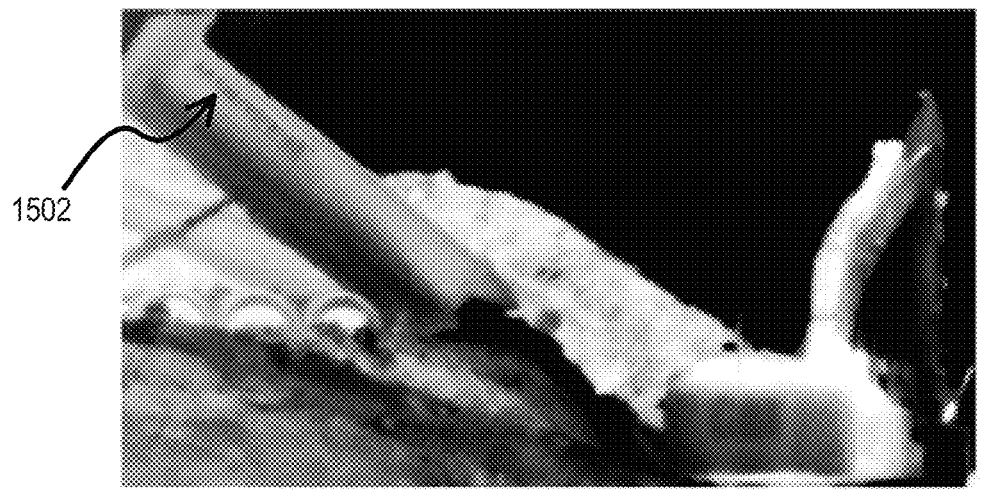
FIG. 15A illustrates an example of an input video image frame captured by an infrared imaging sensor in accordance with an embodiment of the disclosure.
Figure 15B:
FIG. 15B illustrates an example of a resulting video image frame obtained by suppressing distortion caused by atmospheric turbulence in the example image frame of FIG. 15A in accordance with an embodiment of the disclosure.

An example result of methods and systems to suppress atmospheric turbulence in images is illustrated by FIGS. 15A-15B, in accordance with an embodiment of the disclosure. FIG. 15A shows an example raw image (e.g., a frame of input video 1301) captured by a thermal infrared camera, whereas FIG. 15B shows an example processed image obtained by suppressing the distortion, degradation, or other effects of atmospheric turbulence in the example raw image of FIG. 15A in accordance with an embodiment of the disclosure. Compared with the example raw image in FIG. 15A, the example processed image obtained according to the atmospheric turbulence suppression techniques of the disclosure shows much more details and overall improvement of image quality. For example, text 1502 on an object in the processed image of FIG. 15B is in focus and can be read, which is not possible in the raw image of FIG. 15A.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
receiving a plurality of video image frames;
extracting a plurality of image blocks from same or different spatial positions on the different received video image frames along motion trajectories, wherein the motion trajectories includes random displacements due to distortion in the received video image frames;
constructing a plurality of spatiotemporal volumes by grouping the extracted image blocks according to the respective motion trajectories;
smoothing the motion trajectories to suppress the random displacements; and
aggregating the image blocks according to the smoothed trajectories to generate a plurality of processed video image frames, wherein at least some of the distortion is suppressed in the processed video image frames.

2. The method of claim 1, wherein the distortion is due to atmospheric turbulence.

3. The method of claim 1, further comprising:
modifying the spatiotemporal volumes to suppress blurring due to the distortion, wherein aggregating of the image blocks comprises aggregating imaging blocks from the modified spatiotemporal volumes.

4. The method of claim 3, wherein the modifying of the spatiotemporal volumes further comprises:
applying a decorrelating transform to the spatiotemporal volumes to generate corresponding three dimensional (3-D) spectra, wherein each 3-D spectrum comprises a plurality of spectral coefficients for a transform domain representation of a corresponding one of the spatiotemporal volumes;
modifying at least some of the spectral coefficients in each of the 3-D spectra to suppress the blurring due to the distortion; and
applying, to the 3-D spectra, an inverse transform of the decorrelating transform to generate the modified spatiotemporal volumes.

5. The method of claim 4, wherein the modifying of the at least some of the spectral coefficients comprises attenuating temporal-AC coefficients and amplifying temporal-DC coefficients of the 3-D spectra.

6. The method of claim 5, wherein the attenuating of the temporal-AC coefficients and the amplifying of the temporal-DC coefficients are by alpha-rooting the temporal-AC and temporal-DC coefficients.

7. The method of claim 1, wherein the smoothing of the motion trajectories is adaptive to a complexity of the motion trajectories and/or adaptive to a magnitude of the random displacements.

8. The method of claim 1, wherein the smoothing of the motion trajectories comprises determining, by regression, approximate positions of the image blocks without the random displacements.

9. The method of claim 1, wherein the extracting of the plurality of image blocks comprises identifying and tracking similar image blocks from the received video image frames.

10. The method of claim 1, wherein each of the image blocks is a fixed-size patch extracted from a corresponding one of the video image frames.

11. A system comprising:
a video interface configured to receive a plurality of video image frames;
a processor in communication with the video interface and configured to:
extract a plurality of image blocks from same or different spatial positions on the different received video image frames along motion trajectories, wherein the motion trajectories includes random displacements due to distortion in the received video image frames,
construct a plurality of spatiotemporal volumes by grouping the extracted image blocks according to the respective motion trajectories;
smooth the motion trajectories to suppress the random displacement, and
aggregate the image blocks according to the smoothed trajectories to generate a plurality of processed video image frames, wherein at least some of the distortion is suppressed in the processed video image frames; and
a memory in communication with the processor and configured to store the processed video image frames.

12. The system of claim 11, wherein the distortion is due to atmospheric turbulence.

13. The system of claim 11, wherein the processor is further configured to:
modify the spatiotemporal volumes to suppress blurring due to the distortion; and
aggregate the image blocks from the modified spatiotemporal volumes.

14. The system of claim 13, wherein the processor is configured to modify the spatiotemporal volumes by:
applying a decorrelating transform to the spatiotemporal volumes to generate corresponding three dimensional (3-D) spectra, wherein each 3-D spectrum comprises a plurality of spectral coefficients for a transform domain representation of a corresponding one of the spatiotemporal volumes;
modifying at least some of the spectral coefficients in each of the 3-D spectra to suppress the blurring due to the distortion; and
applying, to the 3-D spectra, an inverse transform of the decorrelating transform to generate the modified spatiotemporal volumes.

15. The system of claim 14, wherein the modifying of the at least some of the spectral coefficients comprises attenuating temporal-AC coefficients and amplifying temporal-DC coefficients of the 3-D spectra.

16. The system of claim 15, wherein the attenuating of the temporal-AC coefficients and the amplifying of the temporal-DC coefficients are by alpha-rooting the temporal-AC and temporal-DC coefficients.

17. The system of claim 11, wherein the processor is configured to smooth the motion trajectories by determining, using regression, approximate positions of the image blocks without the random displacements.

18. The system of claim 11, wherein the processor is configured to extract the plurality of image blocks by identifying and tracking similar image blocks from the received video image frames.

19. The system of claim 18, wherein the identifying and tracking of the similar image blocks are based on a multi-scale motion estimation.

20. The system of claim 11, further comprising an infrared camera configured to capture thermal images of the scene, wherein the received video image frames comprise the captured thermal images.

* * * * *